(12) United States Patent
Hirakawa

(10) Patent No.: US 8,860,293 B2
(45) Date of Patent: Oct. 14, 2014

(54) ELECTRON EMITTING ELEMENT AND METHOD FOR PRODUCING THE SAME

(75) Inventor: Hiroyuki Hirakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 371 days.

(21) Appl. No.: 13/086,597

(22) Filed: Apr. 14, 2011

(65) Prior Publication Data

US 2011/0254431 A1 Oct. 20, 2011

(30) Foreign Application Priority Data

Apr. 14, 2010 (JP) .................... 2010-93298

(51) Int. Cl.
*H01J 1/02* (2006.01)
*H01J 1/312* (2006.01)
*H01J 9/02* (2006.01)
*B82Y 10/00* (2011.01)

(52) U.S. Cl.
CPC ......... *H01J 1/312* (2013.01); *H01J 2201/3125* (2013.01); *H01J 9/022* (2013.01); *B82Y 10/00* (2013.01)
USPC .......................................................... 313/326

(58) Field of Classification Search
USPC .................. 313/326, 346 R; 445/29; 361/231
See application file for complete search history.

(56) References Cited

U.S. PATENT DOCUMENTS

| 6,285,123 | B1 | 9/2001 | Yamada et al. |
| 7,399,214 | B2 | 7/2008 | Nishimura et al. |
| 2010/0278561 | A1 * | 11/2010 | Kanda et al. ................... 399/168 |

FOREIGN PATENT DOCUMENTS

| JP | 2000-149766 | 5/2000 |
| JP | 2003-7871 | 1/2003 |
| JP | 2003-197089 | 7/2003 |
| JP | 2006-318702 | 11/2006 |

* cited by examiner

*Primary Examiner* — Anh Mai
*Assistant Examiner* — Brenitra M Lee
(74) *Attorney, Agent, or Firm* — Nixon & Vanderhye P.C.

(57) ABSTRACT

The present invention provides an electron emitting element, comprising: a first electrode; an insulating layer formed on the first electrode and having an opening of through hole; a second electrode formed on the insulating layer, the second electrode being disposed so as to cover at least the opening and face the first electrode via the opening; and a fine particle layer disposed between the first electrode and the second electrode, the fine particle layer being composed of insulating fine particles and conductive fine particles, wherein the insulating layer is disposed between the first electrode and the fine particle layer, or between the second electrode and the fine particle layer, when a voltage is applied between the first electrode and the second electrode, electrons are emitted from the first electrode and accelerated in the fine particle layer to pass through the second electrode.

21 Claims, 15 Drawing Sheets

Fig. 8
(1)
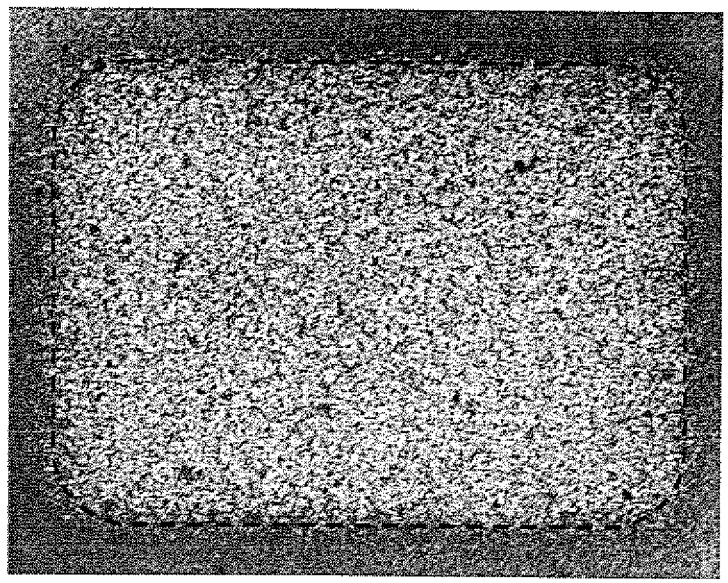
(2)
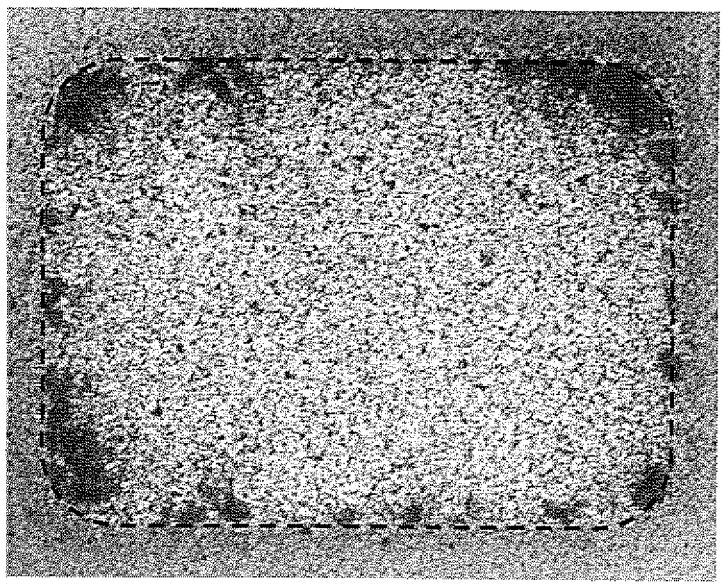

Fig. 9
(1)
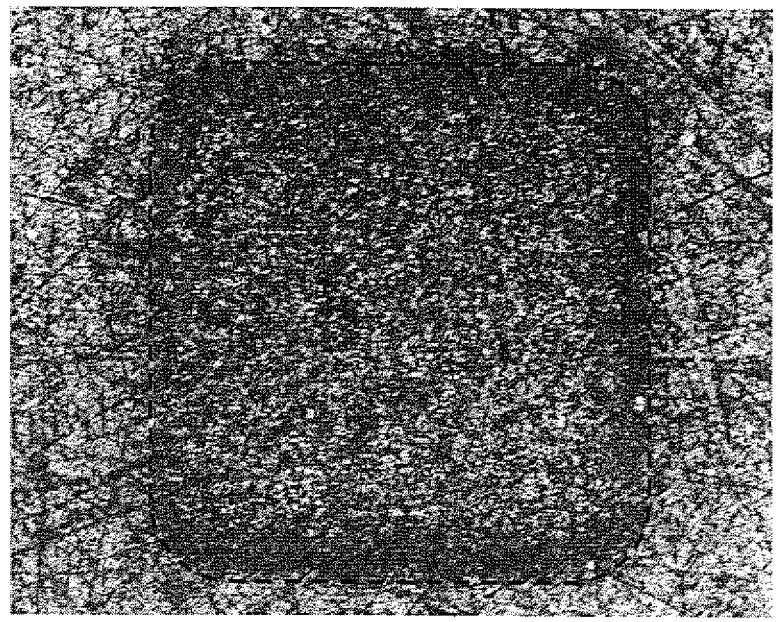
(2)
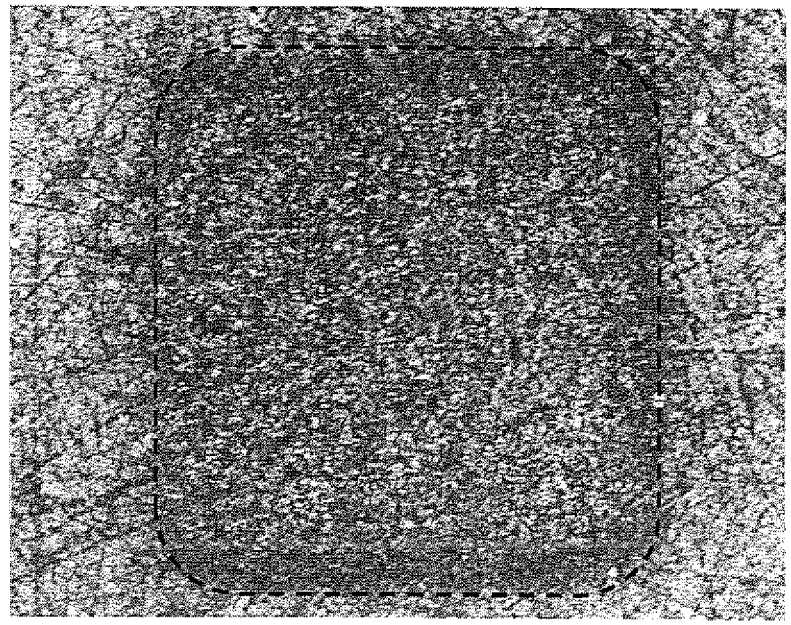

Fig. 19
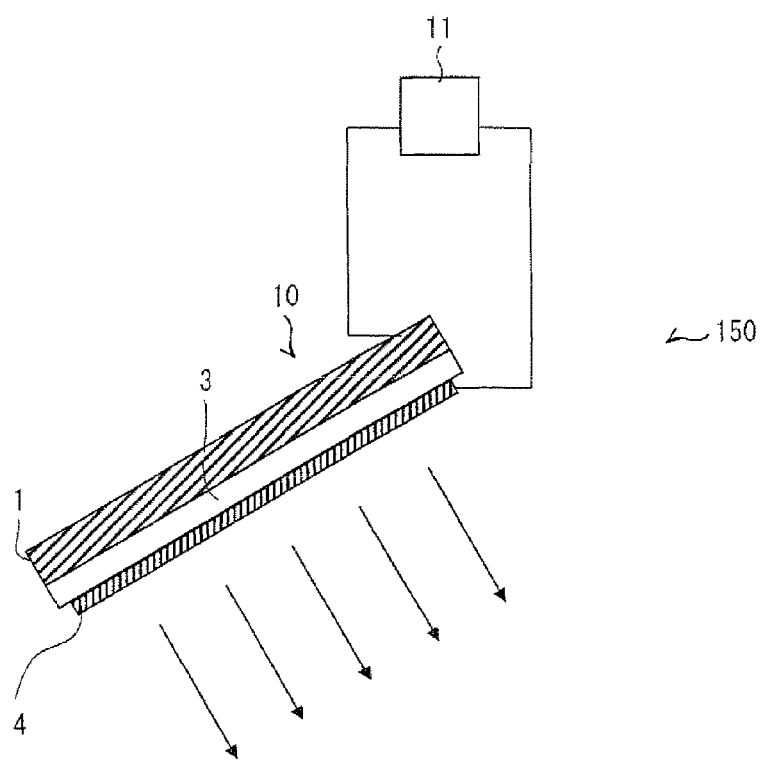
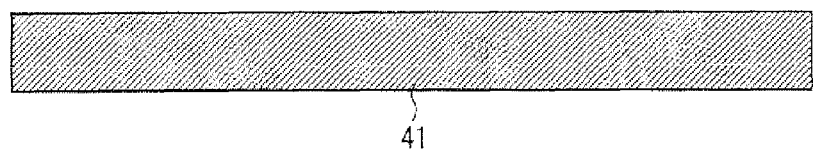

ELECTRON EMITTING ELEMENT AND METHOD FOR PRODUCING THE SAME

CROSS-REFERENCE TO RELATED APPLICATION

This application is related to Japanese Patent Application No. 2010-93298 filed on Apr. 14, 2010, whose priority is claimed and the disclosure of which is incorporated by reference in its entirety.

BACKGROUND OF THE INVENTION

1. Field of the Invention

The present invention relates to an electron emitting element and a method for producing the same.

2. Description of the Related Art

A Spindt-type electrode and a carbon nanotube (CNT) electrode have been known as conventional electron emitting elements. Applications of such electron emitting elements to, for example, the field of FED (Field Emission Display) have been expected. Such electron emitting elements are caused to emit electrons by tunnel effect resulting from an intense electric field of approximately 1 GV/m that is formed by application of a voltage to a pointed section.

However, these two types of electron emitting elements have the intense electric field in the vicinity of a surface of an electron emitting section. Accordingly, electrons emitted obtain a large amount of energy due to the electric field to be more likely to ionize gas molecules. Cations generated due to the ionization of gas molecules are accelerated toward and collide with a surface of the electron emitting element due to the intense electric field. This causes a problem of breakdown of the electron emitting element due to sputtering.

Further, ozone is generated before ions are generated, because oxygen in the atmosphere has dissociation energy that is lower than ionization energy. Ozone is harmful to human bodies and oxidizes various substances because of its strong oxidizing power. This causes a problem in that members around the electron emitting element are damaged. In order to deal with this problem, expensive materials having resistance to ozone should be used for the members around the element.

Meanwhile, against the problems, MIM (Metal Insulator Metal) type and MIS (Metal Insulator Semiconductor) type electron emitting elements have been known as means for preventing breakdown of the element due to sputtering and lessening generation of ozone. These electron emitting elements are surface-emission-type electron emitting elements, each of which accelerate electrons by utilizing quantum size effect and an intense electric field in the electron emitting element so that electrons are emitted from a flat surface of the element. Accordingly, these electron emitting elements do not require an intense electric field outside the elements, because the electrons accelerated in an electron acceleration layer in the elements are emitted to the outside. The MIM type and MIS type electron emitting elements can therefore overcome the problem of breakdown of the element by sputtering due to ionization of gas molecules and the problem of ozone generation, which are likely in the Spindt-type, CNT type and BN type electron emitting elements.

In addition, against the problems, there has been developed an electron emitting element that is capable of stable electron emission in the atmosphere and inhibited from generating harmful substances such as ozone and $NO_x$ when emitting electrons. For example, there has been known an electron emitting element including, between electrodes, an electron acceleration layer containing: conductive fine particles composed of an electrical conductor and having a strong antioxidative effect; and an insulating material having a size larger than the size of the conductive fine particles (see for example, Japanese Unexamined Patent Publication No. 2009-146891).

In some cases, an electron emitting element cannot operate continuously, while it can lessen harmful substances such as ozone and $NO_x$ to be generated upon electron emission. Specifically, a nonuniform electric field may be formed in a part of an electrode, and the electric field may be concentrated in a part of an electron acceleration layer. In this case, if the electron emitting element continuously operates with the concentration of electric field being left as is and application of current goes on, the current is concentrated in the part through which the current flows more easily. This sometimes leads to dielectric breakdown and, as a result, disrupts application of a voltage to the element. It has been therefore desired to develop an electron emitting element that can operate continuously over a long period of time.

SUMMARY OF THE INVENTION

In view of the above-described circumstances, the present invention has been achieved to provide an electron emitting element that can operate continuously over a long period of time.

According an aspect of the present invention, there is provided an electron emitting element, comprising: a first electrode; an insulating layer formed on the first electrode and having an opening of through hole; a second electrode formed on the insulating layer, the second electrode being disposed so as to cover at least the opening and face the first electrode via the opening; and a fine particle layer disposed between the first electrode and the second electrode, the fine particle layer being composed of insulating fine particles and conductive fine particles, wherein the insulating layer is disposed between the first electrode and the fine particle layer, or between the second electrode and the fine particle layer, when a voltage is applied between the first electrode and the second electrode, electrons are emitted from the first electrode and accelerated in the fine particle layer to pass through the second electrode.

The inventors of the present invention found that, when an electron emitting element comprises in sequence: a first electrode; an insulating layer formed on the first electrode and having an opening of through hole; a second electrode formed on the insulating layer, the second electrode being disposed so as to cover at least the opening and face the first electrode via the opening; and a fine particle layer disposed between the first electrode and the second electrode, the fine particle layer being composed of insulating fine particles and conductive fine particles, a current flow would not concentrate on a certain part even if the current flows through the fine particle layer between the first and the second electrodes over a long period of time, to reach completion of the present invention. The present invention can provide an electron emitting element that can operate continuously over a long period of time.

BRIEF DESCRIPTION OF THE DRAWINGS

FIG. 8 is a drawing showing a result of an observation on a surface of an thin-film electrode of an electron emitting element of Comparative Example 3 before and after continuous operation in vacuum;

FIG. 9 is a drawing showing a result of an observation on a surface of an thin-film electrode of an electron emitting element of Example 1 before and after continuous operation in vacuum;

FIG. 13 is a drawing illustrating an example of a charging device and an image forming apparatus including an electron emitting element of the present invention;

FIG. 19 is a drawing illustrating an example of an air blowing device including an electron emitting element of the present invention.

DESCRIPTION OF THE PREFERRED EMBODIMENTS

Figure 1:
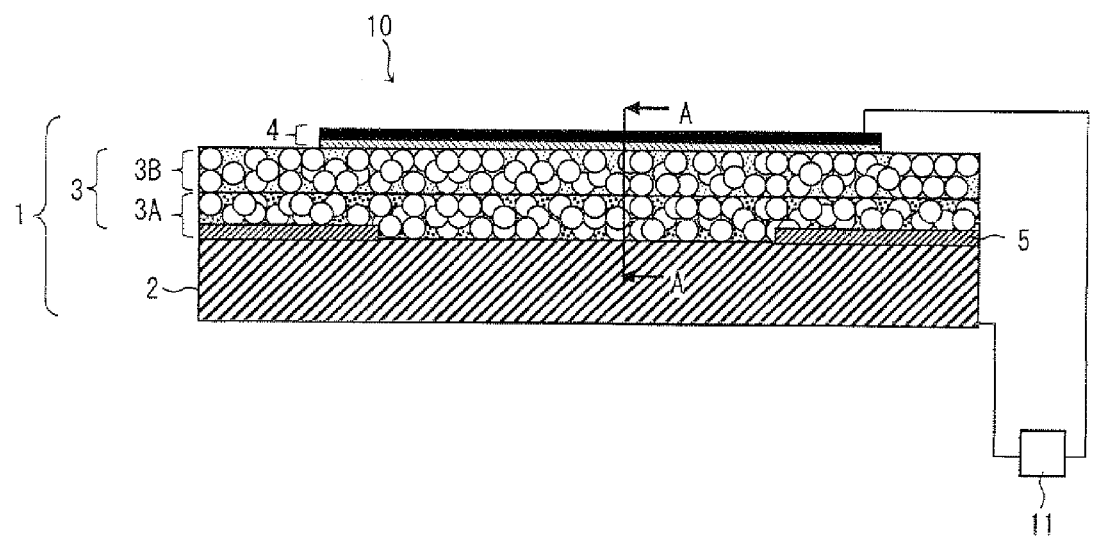
FIG. 1 is a schematic view illustrating a configuration of an electron emitting element according to Embodiment 1 of the present invention.

An electron emitting element of the present invention comprises: a first electrode; an insulating layer formed on the first electrode and having an opening of through hole; a second electrode formed on the insulating layer, the second electrode being disposed so as to cover at least the opening and face the first electrode via the opening; and a fine particle layer disposed between the first electrode and the second electrode, the fine particle layer being composed of insulating fine particles and conductive fine particles, wherein the insulating layer is disposed between the first electrode and the fine particle layer, or between the second electrode and the fine particle layer, when a voltage is applied between the first electrode and the second electrode, electrons are emitted from the first electrode and accelerated in the fine particle layer to pass through the second electrode.

Since the insulating layer having an opening is provided between the first electrode and the second electrode, and the second electrode is disposed so as to face the first electrode via the opening and partially overlap the insulating layer in the present invention, a nonuniform electric field is not formed in a part of the second electrode or in the fine particle layer between the first electrode and the second electrode. Accordingly, an electric field is not concentrated in a part of the fine particle layer even if the electron emitting element operates over a long period of time, and it is possible to provide an electron emitting element that can operate continuously over a long period of time.

Here, the insulating layer is provided between the first electrode and the second electrode, and the fine particle layer is provided between the first electrode, the second electrode and the insulating layer. For example, the insulating layer may be formed to be in contact with the first electrode or disposed between the first electrode and the second electrode to face the electrodes. When the insulating layer is formed to be in contact with the first electrode, the fine particle layer may be disposed between the second electrode and the insulating layer, between the first electrode and the second electrode, and in the opening. When the insulating layer is disposed between the first electrode and the second electrode to face the electrodes, the fine particle layer may be disposed between the first electrode, the second electrode and the insulating layer. (In this case, the fine particle layer includes a fine particle layer disposed between the first electrode and the insulating layer; and a fine particle layer disposed between the second electrode and the insulating layer, and in the opening.)

The insulating layer, which refers to a layer having insulating properties, may be formed from a silicone resin, for example.

In an embodiment of the present invention, in addition to the above-described features of the present invention, recesses may be formed in a surface of the second electrode. The recesses referred to mean parts of the second electrode having a locally decreased film thickness, and the recesses are uniformly distributed on the second electrode.

According to this embodiment, the electron emitting element has the recesses formed in the surface of the second electrode to facilitate formation of so-called current paths, and the current paths formed by the recesses increase the probability of electron emission, that is, increase points where electrons are certainly emitted. Thus, the recesses uniformly distributed on the second electrode allow provision of an electron emitting element that can emit an increased amount of electrons.

The shape of the recesses may be hemispherical or semielliptical, for example. Preferably, the recesses have a diameter of 1 μm to 5 μm, and are distributed at a density of 800 recesses/mm² to 1200 recesses/mm². While it is preferable that the recesses have a smaller diameter, a diameter of 1 μm or more encourages concentration of an electric field in the recesses and formation of current paths, and a diameter of 5 μm or less discourages concentration of an excessive electric field in the recesses and formation of abnormal current paths. Accordingly, the recesses preferably have a diameter within the above-specified range. In addition, while it is preferable that the number of recesses is greater, distribution of the recesses at a density of 800 recesses/mm² or more prevents sparsely-distributed current paths to enable sufficient electron emission from the entire surface, and distribution of the recesses at a density of 1200 recesses/mm$^2$ or less allows maintenance of uniform conductivity in the surface of the second electrode to encourage current supply to the entire surface. Accordingly, the recesses are preferably distributed at a density within the above-specified range.

In an embodiment of the present invention, in addition to the above-described features of the present invention, the second electrode may include a first electrode layer formed on a side of the fine particle layer and a second electrode layer formed on the first electrode layer and having a resistance higher than the first electrode layer, and the recesses may be formed in a surface of the first electrode layer.

Since the recesses are formed in the surface of the first electrode layer, and the second electrode layer having a resistance higher than the first electrode layer is formed on the surface of the first electrode layer in this embodiment, the electric resistance in the recesses is different from the electric resistance in the other part. Accordingly, current paths are formed in the fine particle layer in such a manner that the current paths are concentrated in parts under the recesses and few current paths are formed in the other part. Thus, it is possible to provide an electron emitting element that can operate continuously over a long period of time and emit electrons in a concentrated manner from the recesses distributed uniformly on the second electrode.

The recesses may penetrate the first electrode layer so that the second electrode layer is electrically connected with the fine particle layer. Since the electric resistance associated with the recesses is different from the electric resistance associated with the other part in the surface of the fine particle layer, it is possible to provide an electron emitting element that can emit more electrons from the recesses in a concentrated manner.

In the second electrode, the first electrode layer may be an amorphous carbon layer and the second electrode layer may be a metal layer, for example.

The amorphous carbon layer refers to disorderly deposited clusters (groups each formed by several hundreds atoms) in a graphite structure having so-called SP$^2$ hybrid orbitals. The graphite itself is a material superior in electric conduction, but the electric conduction among the clusters is not so good, because the clusters are in a deposited state. In this case, therefore, the first electrode layer electrically functions as a resistive layer for the second electrode layer (metal layer, for example). Accordingly, when the recesses are formed in the surface of the first electrode layer, and the second electrode layer having a higher resistance than the first electrode layer is formed on the surface of the first electrode, current paths are concentrated in the recesses due to varied planar distribution of the resistance. Thus, it is possible to provide an electron emitting element that can emit electrons in a concentrated manner from the recesses distributed uniformly on the second electrode.

When the second electrode layer is a metal layer, the second electrode layer may be formed of a material including at least one of gold, silver, tungsten, titanium, aluminum and palladium. For example, the second electrode layer is preferably formed of a material including at least one of gold, silver, tungsten, titanium, aluminum and palladium as a main component. Having a lower work function, these substances allow electrons in the fine particle layer for accelerating electrons (hereinafter also referred to as electron acceleration layer) to tunnel efficiently. It is therefore possible to provide an electron emitting element that can emit more high-energy electrons.

In an embodiment of the present invention, in addition to the above-described features of the present invention, the fine particle layer may further comprise an insulating fine particle layer composed of insulating fine particles. That is, the fine particle layer may comprise the layer formed from insulating fine particles and the layer formed from insulating fine particles and conductive fine particles. Such a configuration can lessen roughness of the fine particle layer and therefore discourage generation of an abnormal electric field due to the roughness. It is therefore possible to provide an electron emitting element that can operate continuously over a long period of time.

The insulating fine particle layer is preferably formed on the layer formed from insulating fine particles and conductive fine particles, but may be formed beneath the layer formed from insulating fine particles and conductive fine particles.

In an embodiment of the present invention, in addition to the above-described features of the present invention, the insulating fine particles and the conductive fine particles composing the fine particle layer may be fixed together by a silicone resin. For example, a thermosetting silicone resin may be cured to form the fine particle layer. Thereby, the mechanical strength of the fine particle layer is enhanced, and it is possible to provide an electron emitting element durable in continuous operation.

In addition, since the mechanical strength of the fine particle layer is enhanced, the step of forming the recesses in the second electrode on the fine particle layer (the step of forming the second electrode layer on the first electrode layer to be described below) will be readily performed.

Furthermore, since the silicone resin has a water repellent effect, adhesion of water molecules in the atmosphere to the fine particle layer is inhibited to lessen change of the electric resistance due to water. It is therefore possible to provide an electron emitting element that can steadily work even in continuous operation.

In an embodiment of the present invention, in addition to the above-described features of the present invention, the conductive fine particles may be composed of a material containing at least one of gold, silver, platinum, palladium and nickel. For example, the second electrode layer is preferably formed of a material including at least one of gold, silver, tungsten, titanium, aluminum and palladium as a main component. In this case, the electron emitting element is less pone to deterioration including oxidation by oxygen in the atmosphere. It is therefore possible to provide an electron emitting element that can operate continuously over a long period of time.

The conductive fine particles may have an average particle diameter of 3 nm to 10 nm. In this case, dielectric breakdown will be less likely in the fine particle layer, and ballistic electrons are generated efficiently, though the principle thereof has not been formulated.

In an embodiment of the present invention, in addition to the above-described features of the present invention, the insulating fine particles may be composed of a material containing at least one of $SiO_2$, $Al_2O_3$ and $TiO_2$. For example, the insulating fine particles may be composed of a material containing at least one of $SiO_2$, $Al_2O_3$ and $TiO_2$ as its main component. Since these materials have high insulating properties, it is possible to adjust the resistance of the fine particle layer to any range. In addition, use of an oxide ($SiO_2$, $Al_2O_3$ and $TiO_2$) as a material of the insulating fine particles inhibits oxidation due to oxygen in the atmosphere even if the element continuously operates in the atmosphere, and therefore inhibits deterioration of the electron emitting element. It is therefore possible to provide an electron emitting element that can operate continuously over a long period of time.

In addition, the electron emitting element of the present invention may be used together with a luminous body in a light emitting device to emit electrons to cause the luminous body to emit light, or may be used as a light emitting device in an image display device.

By using the electron emitting element of the present invention in a light emitting device or an image display device comprising the light emitting device, it is possible to provide a light emitting device or an image display device that can operate continuously over a long period of time. Furthermore, it is possible to provide a light emitting device that is stable, long-life and capable of performing planar light emission.

Alternatively, the electron emitting element of the present invention may be used in an air blowing device to emit electrons to send air, or may be used together with a fan in a cooling device to generate ion wind to cool an object.

By using the electron emitting element of the present invention in an air blowing device or a cooling device, it is possible to provide an air blowing device or a cooling device that can operate continuously over a long period of time. In addition, it is possible to provide an air blowing device or a cooling device that operates without electric discharge and generates no harmful substance such as ozone and $NO_x$. These devices can cool an object efficiently by utilizing slip effect on a surface of the object.

Furthermore, the electron emitting element of the present invention may be used together with a photoreceptor in a charging device to emit electrons to charge the photoreceptor, or may be used as a charging device in an image forming apparatus.

By using the electron emitting element of the present invention in a charging device or an image forming apparatus comprising the charging device, it is possible to provide a charging device or an image forming apparatus that can operate continuously over a long period of time. Further, it is possible to provide a charging device or an image forming apparatus that operates without electric discharge and generates no harmful substance such as ozone and $NO_x$. Accordingly, these devices can steadily charge an object for a long period of time without generating harmful substances.

Furthermore, the electron emitting element of the present invention may be used as an electron source in an electron-beam curing device for curing a resist to cause electrons to collide with the resist so that the resist is cured. By using the electron emitting element of the present invention in an electron-beam curing device, it is possible to provide an electron-beam curing device that can operate continuously over a long period of time. In addition, it is possible to achieve area-by-area electron-beam curing and a maskless process, leading to achievement of low cost and high throughput.

In addition, the electron emitting element of the present invention may be used in an electron emitting device. That is, the present invention may be an electron emitting device comprising any one of the above-described electron emitting elements and a power supply for applying a voltage between the first electrode and the second electrode. The power supply may be a direct-current power supply with the first electrode as a negative electrode or an alternating-current power supply. It is possible to provide an electron emitting device that can operate continuously over a long period of time.

These devices, that is, the light emitting device, the image display device, the air blowing device, the cooling device, the charging device, the image forming apparatus, the electron-beam curing device and the electron emitting device may include a plurality of electron emitting elements. For example, a plurality of electron emitting elements may be arranged on a planar body to be applied to these devices. In addition, a plurality of electron emitting elements may share a first electrode to be applied to these devices.

According to another aspect of the present invention, there is provided a method for producing an electron emitting element, the electron emitting element comprising: a first electrode; an insulating layer formed on the first electrode and having an opening of through hole; a second electrode formed on the insulating layer, the second electrode being disposed so as to cover at least the opening and face the first electrode via the opening; and a fine particle layer disposed between the first electrode and the second electrode, the fine particle layer being composed of insulating fine particles and conductive fine particles, Wherein the insulating layer is disposed between the first electrode and the fine particle layer, or between the second electrode and the fine particle layer, when a voltage is applied between the first electrode and the second electrode, electrons are emitted from the first electrode and accelerated in the fine particle layer to pass through the second electrode, the method comprising the steps of: forming the insulating layer having an opening on the first electrode; forming the fine particle layer composed of insulating fine particles and conductive fine particles on the insulating layer so as to fill the opening; and forming the second electrode on the insulating layer, the second electrode being disposed so as to face the first electrode via the opening and partially overlap the insulating layer.

According the aspect of the present invention, it is possible to produce an electron emitting element comprising: a first electrode; an insulating layer formed on the first electrode and having an opening; a second electrode formed on the insulating layer, the second electrode being disposed so as to face the first electrode via the opening and partially overlap the insulating layer; and a fine particle layer disposed between the first electrode, the second electrode and the insulating layer, the fine particle layer being composed of insulating fine particles and conductive fine particles. It is therefore possible to provide a method for producing an electron emitting element that can operate continuously over a long period of time.

In an embodiment of the present invention, in addition to the above-described configuration of the production method of the present invention, the step of forming the insulating layer may comprise the steps of: forming a layer with an ultraviolet-setting and thermosetting silicone resin; heat-treating the layer formed of the silicone resin; irradiating the heat-treated layer with ultraviolet rays through a mask having a predetermined light shielding pattern; and removing a portion of the layer formed of the silicone resin, the portion not irradiated with ultraviolet rays because of the light shielding pattern.

According to this embodiment, the silicone resin is heat-treated and irradiated with ultraviolet rays through the mask, the pattern of the mask is transferred to the silicone resin layer as a difference in the degree of cure of the silicone resin layer. That is, the portion of the film irradiated with ultraviolet rays will be harder than the portion of the film not irradiated. Accordingly, the portion not irradiated with ultraviolet rays can be selectively removed by wiping the UV-irradiated silicone resin layer with soft waste cloth. Thus, the insulating layer having an opening can be formed readily.

Here, the step of removing the portion not irradiated with ultraviolet rays may be the step of wiping away the portion not irradiated with ultraviolet rays with cloth (for example, waste cloth) as described above.

In an embodiment of the present invention, in addition to the above-described configuration of the production method of the present invention, the step of forming the second electrode may comprise the steps of: spraying fine particles onto the fine particle layer; forming a first electrode layer on the fine particle layer having the fine particles sprayed; and forming a second electrode layer on the first electrode layer after removing the fine particles.

According to this embodiment, it is possible to provide a method for producing an electron emitting element in which the second electrode includes the first electrode layer formed on a side of the fine particle layer and the second electrode layer formed on the first electrode layer and having a resistance higher than the first electrode layer, and recesses are formed in a surface of the first electrode layer. That is, it is possible to provide a method for producing an electron emitting element that can operate continuously over a long period of time and emit electrons in a concentrated manner from the recesses distributed uniformly on the second electrode.

The first electrode is a conductor or a semiconductor for applying a voltage to the insulating fine particle layer, and may be a single structure or a structure consisting of a plurality of structures. For example, the first electrode may be a metal plate or a metal film formed on an insulator (such as an aluminum film formed on a glass substrate). The first electrode includes a so-called electrode substrate.

Hereinafter, embodiments and examples of the present invention will be described in detail with reference to FIGS. 1 to 18. It should be noted that the following embodiments and examples are merely concrete examples of the present invention and the present invention is not limited to the following embodiments and examples.

Embodiment 1

FIG. 1 is a schematic view illustrating a configuration of an electron emitting element according to an embodiment of the present invention. As illustrated in FIG. 1, an electron emitting element 1 of the present embodiment comprises: an electrode substrate 2; an insulator thin film 5 (insulating layer) formed on the electrode substrate 2 and having an opening; a thin-film electrode 4 formed on the insulator thin film 5; and a fine particle layer 3 disposed between the electrode substrate 2, the thin-film electrode 4 and the insulator thin film 5.

When a voltage is applied between the electrode substrate 2 and the thin-film electrode 4, the electron emitting element 1 accelerates electrons provided from the electrode substrate 2 in the fine particle layer 3 to emit them from the thin-film electrode 4 (hereinafter, the fine particle layer 3 may be referred to as the electron acceleration layer 3). That is, a current flows through the electron acceleration layer 3 between the electrode substrate 2 and the thin-film electrode 4, and some of electrons in the current become ballistic electrons due to an intense electric field formed by the applied voltage to be emitted from the electron acceleration layer 3 and then emitted from the thin-film electrode 4 to the outside of the element. The electrons emitted from the electron acceleration layer 3 pass (transmit) through the thin-film electrode 4, or pass through holes (gaps) in the thin-film electrode 4 generated due to roughness in the surface of the electron acceleration layer 3 under the thin-film electrode 4 to be emitted to the outside.

The electrode substrate 2 is formed of aluminum. This electrode substrate 2 is a lower electrode (the electrode disposed at a lower part in FIG. 1.) and functions as a substrate. That is, the electrode substrate 2 should be a structure having conductivity (for example, plate-like structure) and being capable of supporting the electron emitting element. Accordingly, a substrate having a certain level of strength and appropriate conductivity is used for the electrode substrate 2. Examples of the electrode substrate 2 include metal substrates of SUS, Al, Ti and Cu; and semiconductor substrates of Si, Ge and GaAs. Alternatively, the electrode substrate 2 may be an insulating substrate having an electrode formed from a conductive material disposed on a surface thereof (that is, may be used a structure obtained by coating a surface of a plate-like structure of an insulator with a conductive material). Examples of such a substrate include a glass substrate and a plastic substrate on which a metal film is formed. In the case of the insulating substrate having an electrode on a surface thereof, the electrode is disposed on a side of the thin-film electrode 4 to be described below.

As the conductive material to be used for forming such an electrode, a material which has excellent conductivity and from which a thin film can be formed by magnetron sputtering is selected. When stable operation of the electron emitting element in the atmosphere is desired, conductive materials having high resistance to oxidation are preferably used. In particular, noble metals are preferably used. ITO, which is an electrically conductive oxide material and widely used for a transparent electrode is also applicable. In addition, Ti and Cu may be used as being capable of forming a tough thin film. For example, a metal thin film obtained by forming a Ti film having a thickness of 200 nm and further forming a Cu film having a thickness of 1000 nm on a surface of a glass substrate may be used.

Since the fine particle layer and the like to be described below will be stacked on the electrode substrate 2, it is preferable to select a substrate having good adhesiveness with the layer (member) to be in direct contact with the electrode substrate 2.

The insulator thin film 5 is formed from a silicone resin, formed on the electrode substrate 2, and has an opening. The insulator thin film 5 may be formed from any material as long as the material functions as an insulator against a voltage for driving the electron emitting element and the material can be patterned, that is, the shape thereof can be controlled to allow the insulator thin film 5 to have an opening. Accordingly, an ultraviolet-setting and thermosetting silicone resin is suitable for the material of the insulator thin film 5. Examples of the silicone resin include SR2411 silicone resin of a room temperature and moisture curing type manufactured by Dow Corning Toray Co., Ltd.

When the insulator thin film 5 is formed from a silicone resin, the film may be patterned to have an opening by the following process. First, a silicone resin is applied onto the electrode substrate 2, and the electrode substrate 2 having the silicone resin is prebaked. Subsequently, the electrode substrate 2 is overlaid with a mask pattern (mask having a pattern of an electrode having an opening) and irradiated with ultraviolet rays for a predetermined period of time. Thereby, the pattern is transferred as a difference in the degree of cure of the silicone resin layer. Since a portion of the film irradiated with ultraviolet rays will be harder than a portion of the film not irradiated with ultraviolet rays, the portion of the silicone resin film not irradiated with ultraviolet rays can be selectively removed by wiping the silicone resin film after the ultraviolet irradiation with soft waste cloth. Thus, the insulator thin film 5 having an opening can be formed from a silicone resin.

Another example of the material of the insulator thin film 5 is a silicon oxide. In the case of a silicon oxide, the insulator thin film 5 having an opening can be formed by using, for example, a general CVD (Chemical Vapor Deposition) device or spattering device capable of forming a silicon oxide film and various ion etching processes. Thus, a silicon oxide, which is an inorganic material, may be used instead of a silicone resin.

The insulator thin film 5 is formed to have a thickness of 500 nm to 1000 nm. Being in this range, the film thickness will not constitute a so large bump to disturb formation of the fine particle layer 3, while ensuring the insulating properties of the film.

Figure 2:
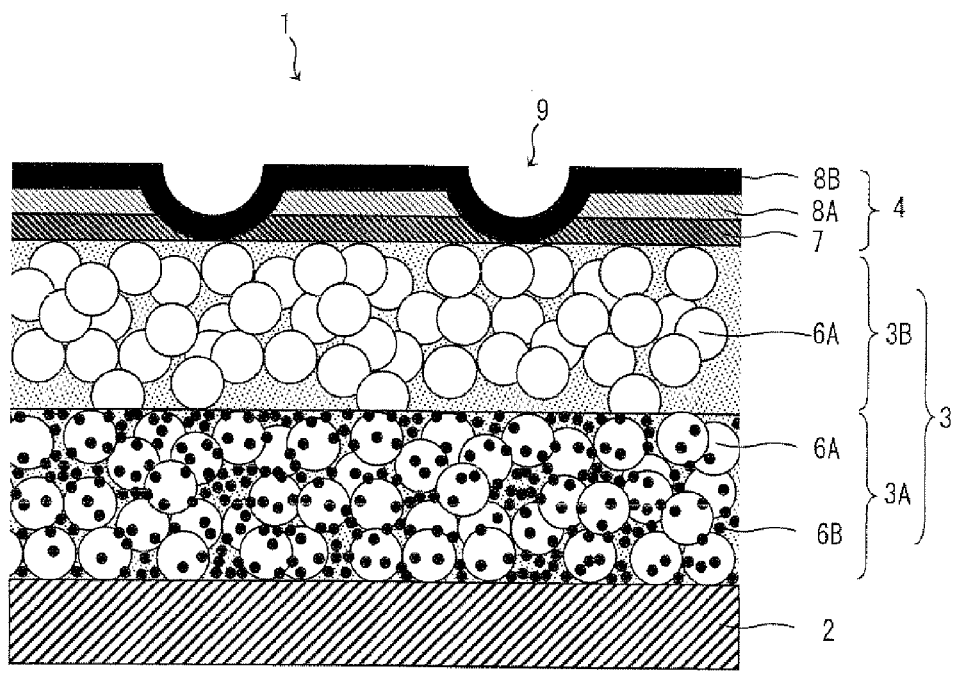
FIG. 2 is a sectional view taken along a line A-A in FIG. 1.

The thin-film electrode 4 includes a plurality of conductive films so that uniform and sufficient electrons are emitted from the entire thin-film electrode 4. FIG. 2 is a sectional view illustrating a configuration of the thin-film electrode 4 and the fine particle layer 3. FIG. 2 is a sectional view taken along a line A-A in FIG. 1.

As illustrated in FIG. 2, the thin-film electrode 4 includes an amorphous carbon layer 7, a porous electrode layer 8A and a solid electrode layer 8B stacked in this order on the fine particle layer 3. On a surface of the thin-film electrode 4, pores 9 (recesses) are formed.

The amorphous carbon layer 7 is formed from disorderly deposited clusters (groups each formed by several hundreds atoms) in a graphite structure having so-called $SP^2$ hybrid orbitals. The graphite itself is a material superior in electric conduction, but the electric conduction among the clusters is not so good, because the clusters are in a deposited state to provide a function as a resistive layer. That is, the amorphous carbon layer 7 has a higher electric resistance than the porous electrode layer 8A and the solid electrode layer 8B.

The amorphous carbon layer 7 is formed to have a thickness of approximately 10 nm. The amorphous carbon layer 7 is formed to have a thickness of 5 nm or more in order to function as a resistive layer.

The porous electrode layer 8A is formed from a material containing gold and palladium as its main components. Any material is used for the porous electrode layer 8A as long as the material allows application of a voltage; for example, the pore electrode layer 8A is formed of a metal. In particular, a material which has a low work function and from which a thin-film can be formed is expected to facilitate the element formed to emit more electrons, in view of a function of the electrode of transmitting and emitting, with a minimum energy loss, electrons which have high energy due to acceleration within the fine particle layer 3 (electron acceleration layer). Examples of such a material include: gold, silver, tungsten, titanium, aluminum and palladium each of which has a work function in a range of 4 eV to 5 eV. Of them, in consideration of operation of the element under an atmospheric pressure, gold is the best material, which is free from oxide or sulfide formation reaction. Further, silver, palladium and tungsten, each of which has a relatively small oxide formation reaction, are also applicable materials that can be used without any problem.

The pores 9 are formed in a surface of the porous electrode layer 8A. The pores 9 are uniformly distributed over the entire porous electrode layer 8A. Generally, a current path in the fine particle layer 3 is easily formed at a point in which an electric field is concentrated. Accordingly, the pores 9 provided in the electrode on the fine particle layer 3 facilitate current path formation in the fine particle layer 3. On one hand, limited concentration of an electric field increases abnormal current paths, which will be a factor causing electric short-circuit. On the other hand, uniformly and widely distributed concentration of an electric field increases electron emission points of the element, leading to increase in the amount of electrons being emitted. Accordingly, the pores 9 distributed uniformly over the entire porous electrode layer 8A will facilitate current path formation in the fine particle layer 3 and increase the amount of electrons being emitted. It is therefore preferable that the pores 9 have a smaller diameter (area) and that more pores 9 are provided. It is also preferable that the pores 9 are distributed uniformly over the entire porous electrode layer 8A.

Specifically, the pores 9 preferably have a diameter of 1 µm to 5 µm, and the pores 9 are preferably distributed in the porous electrode layer 8A at a density of 800 pores/mm² to 1200 pores/mm². A diameter of 1 µm or more encourages concentration of an electric field in the recesses and formation of current paths, and a diameter of 5 µm or less discourages concentration of an excessive electric field in the recesses and formation of abnormal current paths. Distribution of the recesses at a density of 800 recesses/mm² or more prevents sparsely-distributed current paths to enable sufficient electron emission from the entire surface, and distribution of the recesses at a density of 1200 recesses/mm² or less allows maintenance of uniform conductivity in the surface of the second electrode to encourage current supply to the entire surface.

The pores 9 are formed to penetrate the amorphous carbon layer 7 and the porous electrode layer 8A, and to be coated with the solid electrode layer 8B. The solid electrode layer 8B contacts with the fine particle layer 3 at the pores 9. In terms of the structure from the fine particle layer 3 to the solid electrode layer 8B, the pores 9 have an electric resistance different from the parts other than the pores 9, that is, the pores 9 have an relatively low electric resistance, and therefore current paths are concentrated on the pores 9, and more electrons are emitted from the recesses in a concentrated manner.

The pores 9 can be formed by spraying fine particles onto the fine particle layer 3, stacking an amorphous carbon layer and a metal layer containing gold and palladium on the fine particle layer 3 having the fine particles sprayed, and then removing the fine particles sprayed. The shape of the pores 9 is therefore dependent on the shape of the fine particles sprayed in the above-described step. That is, the process of the formation of the thin-film electrode 4 by a sputtering method or a vapor deposition method to be described below is carried out behind the fine particles sprayed. Accordingly, the fine particles having a size larger than the diameter of the pores 9 by several tens of percent are preferably selected. Suitably, silica fine particles are used as the fine particles.

As in the case of the porous electrode layer 8A, the solid electrode layer 8B is formed of a metal layer formed from a material containing gold and palladium as its main components. As in the case of the material of the porous electrode layer 8A, any material is used for the solid electrode layer 8B as long as the material allows application of a voltage. As described above, therefore, the solid electrode layer 8B may be formed from the same material as of the porous electrode layer 8A.

The solid electrode layer 8B is formed so as to cover the porous electrode layer 8A. That is, the solid electrode layer 8B coats the pores 9 as well as a surface of the porous electrode layer 8A. In order for the thin-film electrode 4 to function as an electrode, a metal layer including the porous electrode layer 8A and the solid electrode layer 8B needs to function as an electrode. It is therefore preferable that the layer obtained by combining the porous electrode layer 8A and the solid electrode layer 8B (metal layer) has a thickness (total of the thickness of the porous electrode layer 8A and the thickness of the solid electrode layer 8B) of 10 nm or more. The thickness of 10 nm or more ensures sufficient conductivity as an electrode. In this embodiment, the solid electrode layer 8B is formed to have a film thickness of 20 nm.

The film thickness of the thin-film electrode 4 is an important factor for causing efficient electron emission from the electron emitting element 1 to the outside, and a part having the maximum film thickness is preferably in a range of 15 nm to 100 nm. Thus, the thin-film electrode 4 needs to be formed to have a film thickness of 100 nm or less. With the thin-film electrode 4 having a thickness of more than 100 nm, emission of ballistic electrons will extremely decrease. The decrease in emission of ballistic electrons is considered because the ballistic electrons are absorbed by or reflected on the thin-film electrode 4 to be recaptured in the fine particle layer 3.

The thin-film electrode 4 may be formed of a single conductive film such as, for example, a metal film of gold and palladium, as long as the thin-film electrode 4 functions as an electrode. Alternatively, like this embodiment, the thin-film electrode 4 may be formed of a plurality of conductive films (so-called laminate structure).

The fine particle layer 3 is disposed between the electrode substrate 2 and the thin-film electrode 4, and composed substantially of insulating fine particles 6A. Specifically, as illustrated in FIG. 2, the fine particle layer 3 includes a first fine particle layer 3A formed on the electrode substrate 2 and a second fine particle layer 3B formed on the first fine particle layer 3A.

The first fine particle layer 3A is composed of the insulating fine particles 6A and conductive fine particles 6B, and the insulating fine particles 6A and the conductive fine particles 6B are mainly composed of nanosized particles.

The insulating fine particles 6A are formed from silica ($SiO_2$). Examples of the material of the insulating fine particles 6A include materials having insulating properties and containing $SiO_2$, $Al_2O_3$ or $TiO_2$ as its main component. Specific examples thereof include fumed silica C413 manufactured by Cabot Corporation. The materials having high insulating properties such as $SiO_2$, $Al_2O_3$ and $TiO_2$ facilitate adjustment of the resistance of the fine particle layer 3 to a desired value. Besides, use of these oxides prevents oxidation and deterioration of the element.

The insulating fine particles 6A have an average particle diameter of 50 nm. Preferably, the insulating fine particles 6A have an average particle diameter of 10 nm to 1000 nm. More preferably, the insulating fine particles 6A have an average particle diameter of 10 nm to 200 nm. Respective diameters of the insulating fine particles 6A may be broadly distributed with respect to the average particle diameter. For example, there will be no problem if fine particles having an average particle diameter of 50 nm have a particle diameter distribution in a range of 20 nm to 100 nm. Thus, the insulating fine particles 6A may have such a particle diameter distribution as long as they have an average particle diameter in the above-specified range. When the average particle diameter is too small, the interparticle force will be stronger to easily cause particle flocculation and poor dispersibility. On the other hand, when the average particle diameter is too large, the dispersibility will be better, but voids in the thin-film fine particle layer will be so large that adjustment of the resistance of the fine particle layer will be difficult. Thus, the insulating fine particles 6A preferably have an average particle diameter in the above-specified range.

The conductive fine particles 6B are formed from silver. The conductive fine particles 6B are preferably formed from a noble metal to prevent oxidation and deterioration of the electron emitting element in the atmosphere. Other than silver, for example, the conductive fine particles 6B may be formed of a metal material containing gold, platinum, palladium or nickel as its main component. The conductive fine particles 6 can be produced by using a known fine particle production method such as a sputtering method or a spray heating method. Alternatively, commercially available metal fine particle powders may be used, such as silver nanoparticles manufactured and marketed by Ouyou Nano Laboratory K.K.

The conductive fine particles 6B are nanoparticles having an average particle diameter of 10 nm. In order to control the conductivity of the first fine particle layer 3A, the conductive fine particles 6B need to be fine particles having an average particle diameter smaller than the average particle diameter of the insulating fine particles 6A. It is therefore preferable that the conductive fine particles 6B have an average particle diameter of 3 nm to 20 nm. When the average particle diameter of the conductive fine particles 6B is smaller than the average particle diameter of the insulating fine particles 6A, a conductive path will not be formed by the conductive fine particles 6B in the electron acceleration layer 3 to lessen occurrence of dielectric breakdown in the electron acceleration layer 3. Though there are a lot of unexplained points in regard to a principle, ballistic electrons are efficiently generated by use of the conductive fine particles 6B having an average particle diameter within the above-specified range.

In the first fine particle layer 3A, the insulating fine particles 6A and the conductive fine particles 6B are fixed together by a silicone resin. Thus, it is possible to produce an element having sufficient mechanical strength even though the pores 9 are formed in the porous electrode layer 8A. Furthermore, since the silicone resin has a water repellent effect, adhesion of water molecules to the fine particle layer 3 is inhibited to lessen change of the electric resistance due to water molecules even when the element operates in the atmosphere. It is therefore possible to produce an electron emitting element that can steadily operate. Examples of the silicone resin include SR2411 silicone resin of a room temperature and moisture curing type manufactured by Dow Corning Toray Co., Ltd.

The second fine particle layer 3B is composed of the insulating fine particles 6A. The same fine particles used as the insulating fine particles 6A for the first fine particle layer 3A may be used as the insulating fine particles 6A for the second fine particle layer 3B.

In the second fine particle layer 3B, the insulating fine particles 6A are fixed together by a silicone resin. This silicone resin is also the same as the one used in the first fine particle layer 3A. Accordingly, the above-described effects with respect to the mechanical strength and adhesion of water molecules will be exerted on the second fine particle layer 3B, too.

While the silicone resin is used to fix the fine particles together both in the first fine particle layer 3A and in the second fine particle layer 3B in this embodiment, the silicone resin may be used only in either one of the layers. In this case, the above-described effects with respect to the mechanical strength and adhesion of water molecules will be exerted on a layer in which the silicone resin is used.

The fine particle layer 3 is formed to have a thickness of 1200 nm, in which the first fine particle layer 3A is formed to have a thickness of 700 nm to 800 nm, and the second fine particle layer 3B is formed to have a thickness of 400 nm to 500 nm. Preferably, the fine particle layer 3 is formed to have a thickness of 300 nm to 4000 nm in order to have a uniform thickness and a uniform resistance in a direction of the thickness. In terms of the function as a layer for accelerating electrons, the fine particle layer 3 may include only the first fine particle layer 3A, and therefore the thickness thereof may be controlled as a total thickness of the first fine particle layer 3A and the second fine particle layer 3B.

Though the fine particle layer 3 may include only the first fine particle layer 3A, it is preferable that the fine particle layer 3 includes the first fine particle layer 3A and the second fine particle layer 3B as in the case of the present embodiment. That is, when the degree of surface roughness is too large relative to the thickness of the fine particle layer 3, the surface generates an abnormal electric field due to its shape to cause current constriction. In addition, prolonged application of a current to the element can incidentally generate a current constriction point in the fine particle layer 3. In order to avoid such problems, it is preferable that the fine particle layer 3 includes the first fine particle layer 3A and the second fine particle layer 3B to lessen surface roughness of the fine particle layer 3. While it is better that the fine particle layer 3 has a smaller thickness, increase of the thickness to some extent is effective for the above-described problems.

Figure 3:
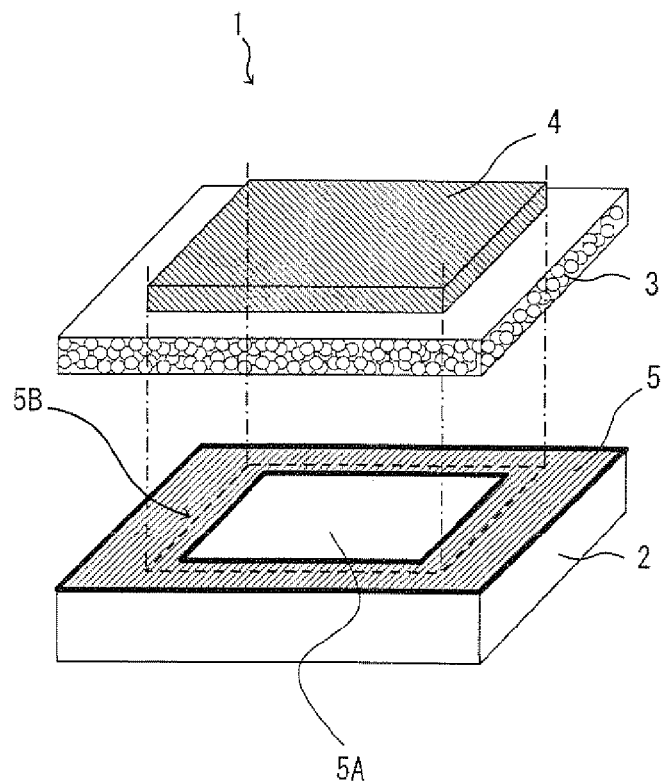
FIG. 3 is a schematic view illustrating a planar shape of an insulating layer of the electron emitting element according to Embodiment 1 of the present invention.

The fine particle layer 3 is formed on the insulator thin film 5 and disposed between the insulator thin film 5 and the thin-film electrode 4. At the opening of the insulator thin film 5, the fine particle layer 3 is disposed between the substrate electrode 2 and the insulator thin film. The fine particles (insulating fine particles 6A and conductive fine particles 6B) in the fine particle layer 3 fill the opening of the insulator thin film 5. FIG. 3 shows the positional relationship therebetween.

FIG. 3 is a schematic view illustrating a planar shape of an insulating layer of an electron emitting element, showing the shape and the position of the insulator thin film 5 relative to the fine particle layer 3 and the thin-film electrode 4. In this drawing, the insulator thin film 5 and the fine particle layer 3 are separated at a surface of the insulator thin film 5 to show the shape and the position of the insulator thin film 5. In FIG. 3, the broken line on the insulator thin film 5 is a projection-line 5B obtained by projecting the edges of the thin-film electrode 4 onto the insulator thin film 5, that is, the projection-line 5B represents the shape of the thin-film electrode 4.

As illustrated in FIG. 3, the insulator thin film 5 has an opening 5A, the electrode substrate 2 faces the thin-film electrode 4 via the opening 5A, and the thin-film electrode 4 is disposed so that the edges thereof overlap the insulator thin film 5. That is, the edges of the thin-film electrode have a predetermined distance from the edges of the opening 5A of the insulator thin film 5, and the thin-film electrode 4 is larger than the opening 5A of the insulator thin film 5 and disposed so as to cover the opening 5A via the fine particle layer 3.

The insulator thin film 5 is formed so as to cover the electrode substrate 2 to protect the fine particle layer 3 from concentration of an electric field (current constriction) occurring at the edges of the thin-film electrode 4 (that is, to cover the edges of the thin-film electrode 4). In this embodiment, an entire surface of the substrate electrode 2 corresponding to the area of the insulator thin film 5 is covered with the insulator thin film 5 to cover the edges of the thin-film electrode 4.

Meanwhile, a current needs to be applied to the fine particle layer 3 to cause the element to function as an electron emitting element. The insulator thin film 5 therefore has the opening. That is, a section corresponding to electron emission points is cut out. At the cut out section, that is, at the opening 5A of the insulator thin film 5, the electrode substrate 2 contacts with the fine particle layer 3, and the thin-film electrode 4 covers the opening 5A via the fine particle layer 3. With reference to the projection-line 5B of the edges of the electrode in the FIG. 3, the opening 5A is located inward with respect to the area surrounded by the projection-line 5B. (The thin-film electrode 4 is disposed above the insulator thin film 5 so that the edges thereof do not coincide with the edges of the opening 5A and overlap the insulator thin film 5.)

Such a configuration will allow the insulator thin film 5 to lessen influence of concentration of an electric field occurring at the edges of the thin-film electrode 4 on the fine particle layer 3 to inhibit abnormal current constriction. That is, formation of a nonuniform electric field in the fine particle layer between the edges of the first electrode and the second electrode may be prevented by the following mechanism.

When a voltage is applied between the electrode substrate 2 and the thin-film electrode 4, current paths are formed in the fine particle layer 3 (electron acceleration layer), and some charges become ballistic electrons due to an intense electric field formed by the applied voltage to be emitted from the side of the thin-film electrode 4. While there are many unexplained points about the mechanism of ballistic electron generation in the fine particle layer 3 at present, it is assumed that some charges conducting through the current paths formed in the fine particle layer 3 are accelerated at an intensive electric field locally formed in the fine particle layer 3 to be hot electrons (ballistic electrons) to escape from a surface of the element to open space. Electrons emitted between the fine particle layers constituting the fine particle layer 3 advance along the electric field formed in the fine particle layer 3 while repeating elastic collision, and some of the electrons pass through the thin-film electrode on the top or escape from gaps in the electrode to come out of the surface of the element.

On this occasion, an electrical insulation effect of the insulator thin film 5 prevents a current from flowing through a part of the fine particle layer 3 where the insulator thin film 5 is disposed between the fine particle layer 3 and the electrode substrate 2, even though the fine particle layer 3 is sandwiched between the electrode substrate 2 and the thin-film electrode 4. In a part of the fine particle layer 3 where the insulator thin film 5 is not disposed between the fine particle layer 3 and the electrode substrate 2, a uniform electric field is formed in the fine particle layer 3 due to a potential difference between the two electrodes to allow a current to flow through the part of the fine particle layer 3, and some of the electrons of the current are emitted as hot electrons to open space. In a part of the fine particle layer 3 sandwiched by the edges of the thin-film electrode 4 and the electrode substrate 2, a nonuniformly concentrated electric field is formed, but the shape-controlled insulator thin film 5 (dielectric thin film) is present in a way along the line of electric force to exert its electrical insulation effect to weaken the electric field and prevent the current flow. Accordingly, no current path is formed, in the part of the fine particle layer 3 immediately under the edges of the thin-film electrode 4, in which, conventionally, a nonuniform electric field is easily formed and the current is easily concentrated, and such a state will be sustained even after prolonged application of the current. The current from the part of the thin-film electrode 4 corresponding to the opening 5A to the electrode substrate 2 will keep flowing without being concentrated in a particular part to maintain electron emission from the entire surface even after prolonged application of the current.

In FIG. 3, the fine particle layer 3 is disposed in the opening 5A (not shown). In this embodiment, the opening 5A is filled with the insulating fine particles 6A and the conductive fine particles 6B, because the first fine particle layer 3A is disposed on a side of the insulator thin film 5 (side of the electrode substrate 2).

In use of the electron emitting element, the electrode substrate 2 and the thin-film electrode 4 are connected to a power supply 11. As illustrated in FIG. 1, an electron emitting device 10 may be formed to include the electron emitting element 1, and the power supply 11 connected to the electrode substrate 2 and the thin-film electrode 4.

Production Method

Next, a method for producing the electron emitting element 1 according to Embodiment 1 will be described. First, the insulator thin film 5 having the opening is formed on the electrode substrate 2. An ultraviolet-setting and thermosetting silicone resin is applied onto the electrode substrate 2 (for example, by a spin coating method) and the electrode substrate 2 having the silicone resin applied is prebaked (for example, at 200° C., may be referred to as low-hardness curing). Next, the electrode substrate 2 prebaked is overlaid with a mask having an opening and a pattern drawn with chromium (quartz thin plate) and irradiated with ultraviolet rays (wavelength: 172 nm). Thereby, the desired pattern drawn in the mask is transferred as a difference in the degree of cure of the silicone resin film. That is, a portion of the film irradiated with ultraviolet rays will be harder than a portion of the film not irradiated. The surface of the electrode substrate 2 irradiated with ultraviolet rays is wiped with cloth (for example, soft waste cloth). Thereby, the portion of the silicone resin film not irradiated with ultraviolet rays can be selectively removed. Other than the above-described method, the insulator thin film 5 having the opening can be formed by an inkjet printing method or a photolithography method. For example, a silicon oxide film may be formed with a CVD (Chemical Vapor Deposition) device or a spattering device, and a portion of the silicon oxide film formed may be removed by various ion etching processes.

Subsequently, the fine particle layer (fine particle layer 3A and fine particle layer 3B) is formed on the insulator thin film 5. First, a dispersion A to be the material of the fine particle layer 3A and a dispersion B to be the material of the fine particle layer 3B are prepared. The dispersion A is prepared by sequentially adding insulating fine particles and conductive fine particles into a solvent, and dispersing the fine particles with an ultrasonic disperser. The dispersion B is prepared by sequentially adding insulating fine particles and a silicone resin solution into a solvent, and dispersing the fine particles with an ultrasonic disperser. The dispersion solvents are not particularly limited as long as they can form a slurry in which the materials of each dispersion are dispersed. Examples of the dispersion solvents include toluene, benzene, xylene and hexane. The fine particles may be dispersed by other means than the ultrasonic disperser.

Next, the dispersion A is applied onto the electrode substrate 2 on which the insulator thin film 5 having the opening has been formed (for example, by a spin coating method) to form the fine particle layer 3A. After the application of the dispersion A, the solvent is vaporized through baking. The dispersion A is applied over the entire surface of the electrode substrate 2, that is, not only onto the insulator thin film 5 but also into the opening 5A. Other than the spin coating method, the dispersion can be applied by a dropping method, a spray coating method, a spray method or an inkjet method, for example. The fine particle layer 3A having a desired film thickness can be formed by repeating the application by the spin coating method or another method and drying.

Next, the fine particle layer 3B is formed on the fine particle layer 3A formed on the electrode substrate 2 in the same manner as in the dispersion A. On this occasion, the silicone resin included in the dispersion B infiltrates the fine particle layer 3A and, as a result, the respective fine particles composing the fine particle layer 3A will be bound (fixed) together by the silicone resin. After the application of the dispersion B, the baking is performed again.

Subsequently, the thin-film electrode 4 is formed on the fine particle layer. The thin-film electrode 4 includes the amorphous carbon layer 7, the porous electrode layer 8A and the solid electrode layer 8B. The thin-film electrode 4 is formed as follows.

First, in order to form the pores 9, spherical shielding matters are dispersed in a solvent to prepare a dispersion C, and the dispersion C is applied onto the fine particle layer formed on the electrode substrate 2. The spherical shielding matters will be uniformly distributed on the fine particle layer when the solvent evaporates.

Next, the electrode substrate 2 having the spherical shielding matters distributed is overlaid with a mask having a pattern of an opening corresponding to the shape of the thin-film electrode 4, and then the amorphous carbon layer 7 and the metal thin-film layer 8A are sequentially formed by a sputtering method. Here, the spattering target may be gold, silver, tungsten, titanium, aluminum and/or palladium.

Next, dry air is blown to the surface of the electrode substrate 2 having the films formed to remove the spherical shielding matters. Thereby, the porous electrode layer 8A is completed.

Next, still with the mask having a pattern of the opening corresponding to the shape of the thin-film electrode 4, a metal thin film is formed over the entire surface of the electrode substrate 2 having the porous electrode layer 8A formed by a sputtering method. Thereafter, the mask is removed. Thereby, the solid electrode layer 8B is completed. Thus, the electron emitting element according to Embodiment 1 is completed.

Next, the structure of the thin-film electrode 4 and results of an experiment performed on the effect thereof will be described.

Example 1

First, detailed conditions for producing the electron emitting element 1 will be described.

The insulator thin film 5 having the opening and a predetermined shape was formed.

Into a 10-mL reagent bottle, 0.7 g of a n-hexane solvent was poured, and then 0.35 g of a silicone resin solution was added. The reagent bottle was shaken by hand to obtain a dilute solution of the silicone resin. Here, the silicone resin was SR2411 silicone resin of a room temperature and moisture curing type (manufactured by Dow Corning Toray Co., Ltd.)

A 24 mm square aluminum substrate was prepared as the electrode substrate 2, and the dilute solution of the silicone resin was applied dropwise onto the substrate to form a silicone resin layer on an entire surface of the substrate by a spin coating method. The film formation by the spin coating method was carried out under the following conditions: the dilute solution was applied dropwise onto the surface of the substrate while the substrate was spun at 500 RPM for one second, and then the substrate was further spun at 3000 RPM for 10 seconds. The aluminum substrate was heated for curing with a hot plate at 200° C. for 15 minutes.

The substrate was overlaid with a mask obtained by drawing a pattern on a quartz thin plate with chromium and irradiated with vacuum ultraviolet rays having a wavelength of 172 nm for 15 minutes. The pattern of the mask drawn with chromium was in a shape of 1.4 mm squared. After the irradiation with ultraviolet rays, the pattern drawn in the mask was transferred as a difference in the degree of cure of the silicone resin film. A portion of the film irradiated with ultraviolet rays would be harder than a portion of the film not irradiated. A dielectric barrier discharge excimer lamp (by Ushio Inc.) was used for the light source of the vacuum ultraviolet.

The surface of the substrate after the ultraviolet irradiation was wiped with soft waste cloth to remove only the portion of the silicone resin film not irradiated with ultraviolet rays. Thereby, a 1.4-millimeter-square window (exposed part of the surface of the aluminum substrate) was formed in the silicone resin film.

Next, the fine particle layer (electron acceleration layer) 3 was formed.

Into a 10-mL reagent bottle, 1.5 g of a n-hexane solvent was poured and 0.25 g of silica fine particles were added as insulating fine particles. Then, the reagent bottle was applied to an ultrasonic disperser to disperse the fine particles as described above. Here, the silica particles were fumed silica C413 having an average particle diameter of 50 nm (by Cabot Corporation), and the surfaces thereof were treated with hexamethyldisilazane. After the application to the disperser for 5 minutes, the silica fine particles were dispersed to be opaque white in the hexane solvent. Then, 0.06 g of silver nanoparticles were added as conductive fine particles and ultrasonic dispersion was performed as described above. The silver nanoparticles were a product (by Ouyou Nano Laboratory K.K.) having an average particle diameter of 10 nm and being coated and insulated with an alcoholate. The resulting dispersion was used as the dispersion A. Likewise, into a 10-mL reagent bottle, 1.5 g of a n-hexane solvent was poured and 0.25 g of silica fine particles, fumed silica C413, were added as insulating fine particles. Then, the reagent bottle was applied to an ultrasonic disperser to disperse the fine particles as described above. Then, 0.036 g of a silicone resin solution was added and ultrasonic dispersion was performed as described above. The silicone resin was SR2411 silicon resin (same as above) of a room temperature and moisture curing type. The resulting dispersion was used as the dispersion B.

The dispersion A was applied dropwise onto the electrode substrate 2 having the silicone resin film having the window (exposed part of the surface of the aluminum substrate) to form the first fine particle layer 3A by a spin coating method. The substrate having the first fine particle layer 3A formed was heated and dried with a hot plate at 150° C. for 1 minute. Likewise, the second fine particle layer 3B was further formed with the dispersion B. The substrate having the second fine particle layer 3B formed was heated and dried with a hot plate at 150° C. for 1 minute.

The film formation by the spin coating method was carried out under the following conditions: the dispersion was applied dropwise onto the substrate while the substrate was spun at 500 RPM for one second, and then the substrate was further spun at 3000 RPM for 10 seconds.

Subsequently, the thin-film electrode 4 was formed.

Into a 10-mL reagent bottle, 1.0 g of an ethanol solvent was poured, and 0.1 g of silica fine particles were added as spherical shielding matters. The reagent bottle was applied to an ultrasonic disperser for 5 minutes to disperse the fine particles. Here, the silica fine particles were fumed silica SE-5V having an average particle diameter of 8 μm (by Tokuyama Corp.) and surface-treated with hexamethyldisilazane as well as with aminosilane. The resulting dispersion was used as the dispersion C.

The dispersion C was applied dropwise to the aluminum electrode substrate 2 having the fine particle layer 3 formed, and the spherical shielding matters were distributed uniformly by a spin coating method. The substrate having the spherical shielding matters distributed was heated with a hot plate at 150° C. for 1 minute to vaporize the solvent.

Thereafter, the electrode substrate 2 having the spherical shielding matters distributed was overlaid with a metal mask (in a shape of 2.0 mm squared) modeled on the shape of the thin-film electrode 4. At this time, the metal mask was aligned so that the center of the metal mask coincided with the center of the window of the insulator thin film 5 formed earlier (where the electron acceleration layer 3 was stacked directly on the surface of the aluminum substrate), and each of the edges of the metal mask was 0.3 mm distant from each of the edges of the window of the insulator thin film 5.

After the metal mask was fixed, a carbon film was vapor-deposited with a resistance-heating vapor deposition apparatus, and then a gold/palladium target (Au—Pd) was spattered with a spattering device to obtain an electrode film to be the origin of the porous electrode layer 8A. The thickness of the amorphous carbon layer 7 was 10 nm, and the thickness of the gold/palladium electrode film was 20 nm.

Subsequently, dry air was blown to the surface of the electrode film to remove the spherical shielding matters. Thereby, the porous electrode layer 8A was obtained.

Figure 5:
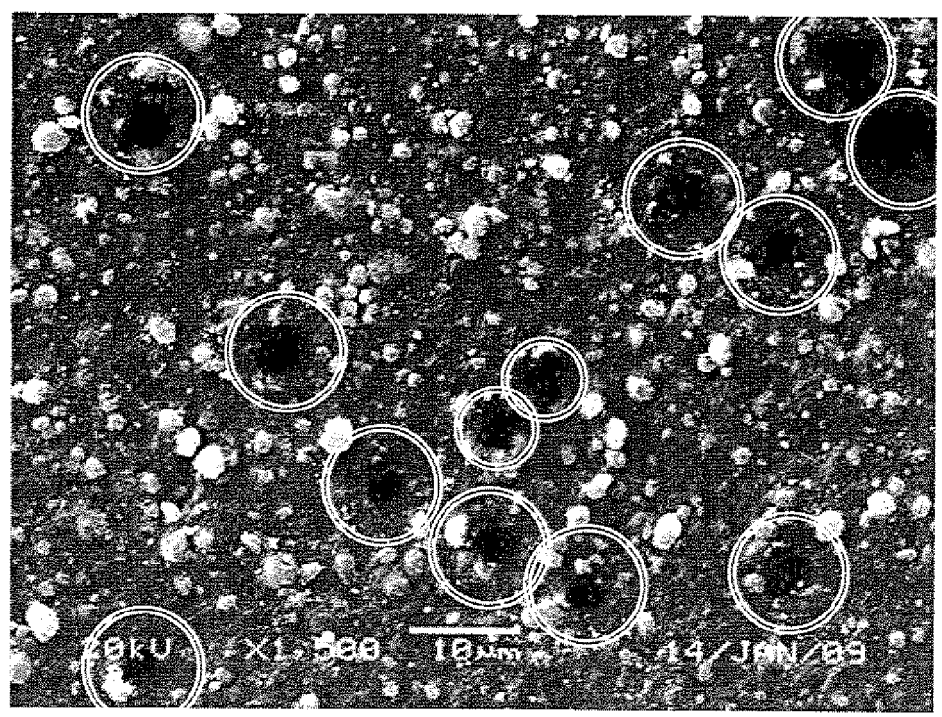
FIG. 5 is an SEM image of a surface of a gold/palladium metal film (porous electrode layer) after spherical shielding matters of Example 1 were blown away.

FIG. 5 is an SEM photograph of a surface of the gold/palladium metal film after the spherical shielding matters were blown away. In the parts enclosed in white circles in FIG. 5, the spherical shielding matters had been present to prevent the amorphous carbon layer 7 and the metal thin film 8 from being stacked. The pores 9 had a diameter of 4.5 μm and were distributed at a density of 930 μores/mm$^2$.

Lastly, the metal mask was placed back to the same position, and the solid electrode layer 8B consisting only of a metal material was formed on an entire surface of the porous electrode layer 8A from which the spherical shielding matters were removed by using a gold/palladium target (Au—Pd). The film thickness of the solid electrode layer 8B was 20 nm.

Figure 4:
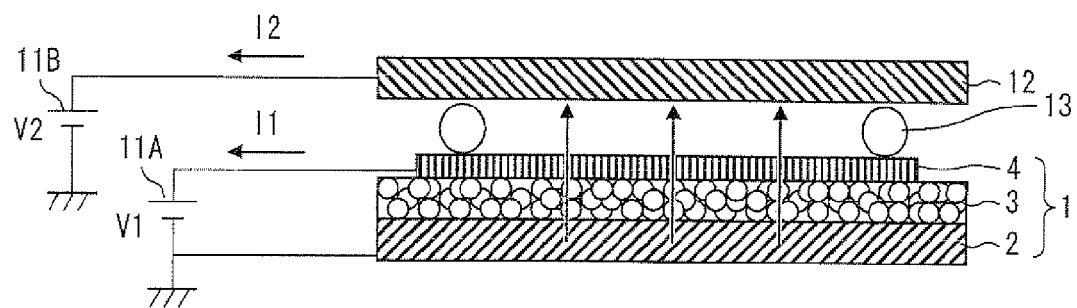
FIG. 4 is a drawing illustrating a measurement system for an electron emission experiment.

FIG. 4 illustrates a measurement system used for an electron emission experiment. In the measurement system in FIG. 4, a counter electrode 12 was disposed on the side of the pored thin-film electrode 4 of the electron emitting element 1 so that the counter electrode 12 and the thin-film electrode 4 had an insulating spacer 13 (diameter: 1 mm) therebetween. A power supply 11A was provided to apply a voltage V1 between the electrode substrate 2 and the thin-film electrode 4, and a power supply 11B was provided to apply a voltage V2 to the counter electrode 12. A current I1 flowing between the thin-film electrode 4 and the power supply 11A was measured as the in-element current, and a current I2 flowing between the counter electrode 12 and the power supply 11B was measured as the electron emission current. The experiment system was set up in vacuum at $1\times10^{-8}$ ATM to carry out the electron emission experiment.

An element including a non-pored electrode formed only of gold/palladium and having a film thickness of 40 nm (Comparative Example 1 including the thin-film electrode 4 consisting only of a solid metal layer), and an element including a non-pored electrode obtained by stacking an α-carbon film having a thickness of 10 nm and then a gold/palladium film having a thickness of 40 nm (Comparative Example 2 including the thin-film electrode 4 consisting of an amorphous carbon layer and a solid electrode layer) were produced and measured for the volt-ampere characteristics as comparative experiments.

Figure 6:
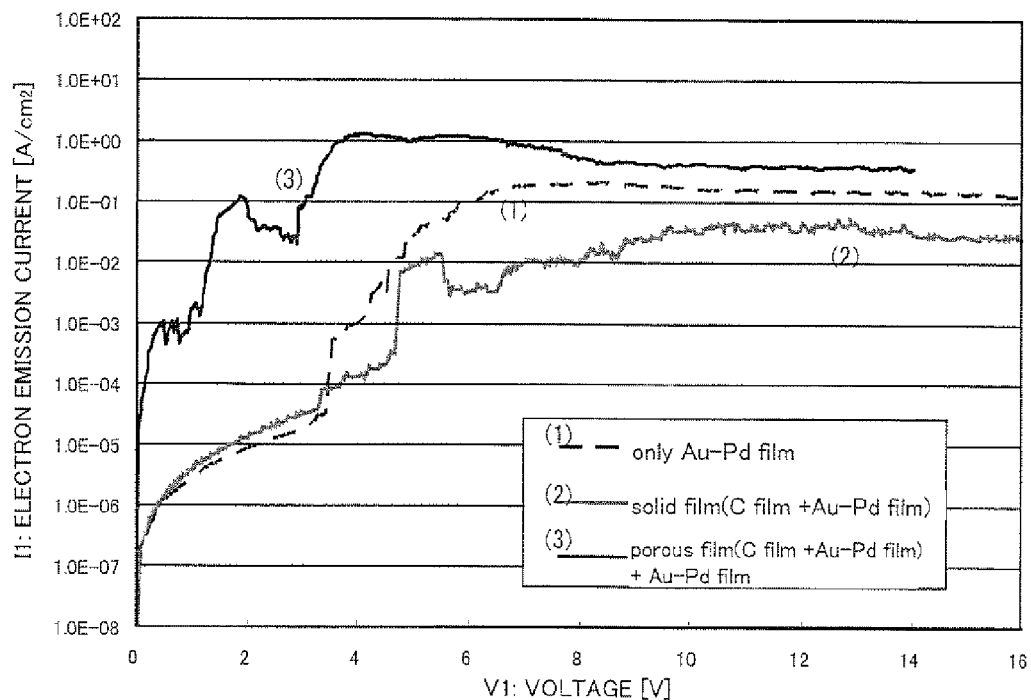
FIG. 6 is a drawing showing results of electron emitting elements of Example 1 and Comparative Examples 1 and 2 measured for the in-element current.
Figure 7:
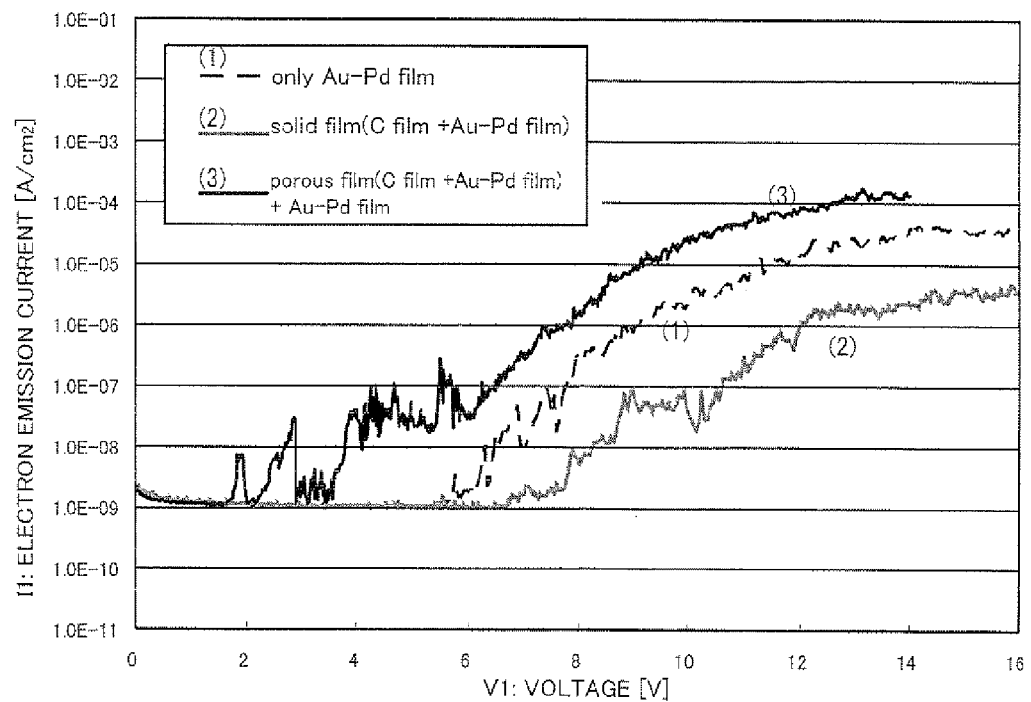
FIG. 7 is a drawing showing results of the electron emitting elements of Example 1 and Comparative Examples 1 and 2 measured for the electron emission current.

FIG. 6 and FIG. 7 show the results of Example 1 and Comparative Examples 1 and 2 measured for the in-element current I1 and the electron emission current I2. In FIG. 6 and FIG. 7, "(1) only Au—Pd film", "(2) solid film (C film+Au—Pd film)" and "(3) porous film (C film+Au—Pd film)+Au—Pd film" correspond to Comparative Example 1, Comparative Example 2 and Example 1, respectively.

FIG. 6 shows the results of the electron emitting elements 1 measured for the in-element current I1 [A/cm$^2$]. The voltage V1 was raised stepwise from 0 V to 14 V or 16 V, and the voltage V2 was 100 V. Based on the in-element current I1 of the element including the thin-film electrode 4 consisting only of a non-pored gold/palladium film (Comparative Example 1), the in-element current I1 decreased when an α-carbon film was included (Comparative Example 2), indicating that the α-carbon film functioned as a resistive layer. On the other hand, the in-element current I1 of the element including the thin-film electrode 4 formed as a porous film as described above (Example 1) increased, indicating that the thin-film electrode 4 sufficiently functioned to allow formation of current paths originating on the pores 9.

FIG. 7 shows the results of the electron emitting elements 1 measured for the electron emission current I2 [A/cm$^2$], which was performed at the same time as the measurement of FIG. 6. Based on the electron emission current I2 of the element including the thin-film electrode 4 consisting only of a non-pored gold/palladium film (Comparative Example 1), the electron emission current I2 decreased when an α-carbon film was included (Comparative Example 2). This was caused as a result of the decease in the in-element current I1. As in the case of the in-element current I1, the electron emission current I2 of the element including the thin-film electrode 4 formed as a porous film as described above (Example 1) increased. This indicates that the formation of the pores 9 in the thin-film electrode 4 is advantageous for increase of the amount of electrons being emitted.

Next, results of an experiment performed on the effect of the insulator thin film 5 will be described.

An electron emitting element 1 was produced in the same manner as described above, except that no insulator thin film 5 was included (Comparative Example 3 including no insulator thin film 5 with respect to Example 1 including the insulator thin film 5). The element produced was brought into continuous operation in vacuum and a surface thereof was observed. FIG. 8 and FIG. 9 show the results.

FIG. 8 shows macrophotographs of the surface of the element including no insulator thin film 5 (Comparative Example 3) before and after the continuous operation in vacuum.

FIG. 8 (1) shows a macrophotograph of the surface of the electron emitting element 1 before the operation. The broken line represents the shape of the thin-film electrode 4. (Only in this experiment, the thin-film electrode 4 was in the shape of a 1.4×1.0 mm$^2$ rectangle.) FIG. 8 (2) shows a macrophotograph of the surface of the electron emitting element 1 after 20-hour continuous current application.

FIGS. 8 (1) and (2) show that the continuous current application lead to current constriction in the edges of the thin-film electrode 4, causing discoloration into black. An elemental analysis confirmed that the discoloration into black was due to deposition of carbon. This phenomenon is known as a contamination film, which is generated in an instrument for observing a sample surface with an electron beam probe of an SEM, for example. That is, residual gas in the measurement space or gas emitted from the sample is polymerized and deposited with a hydrocarbon as a main matter by the energy of the electron beam. In view of this physical phenomenon, it can be decided that the electron emitting element 1 shown in FIG. 8 (2) eventually emitted electrons only from the edges of the thin-film electrode 4. This is due to the current constriction in the edges of the thin-film electrode 4 as described above.

FIG. 9 shows macrophotographs of a surface of the element including the insulator thin film 5 before and after the continuous operation in vacuum. The broken line in FIG. 9 represents the shape of the thin-film electrode 4. FIG. 9 (1) shows a macrophotograph of the surface of the electron emitting element 1 before the operation, and FIG. 8 (2) shows a macrophotograph of the surface of the electron emitting element 1 after 20-hour continuous current application.

Unlike FIG. 8, no discoloration into black concentrated in the edges of the thin-film electrode 4 was observed in FIG. 9. It is therefore concluded that current constriction in the edges of the thin-film electrode 4 due to the continuous current application to the electron emitting element 1 was prevented.

Figure 10:
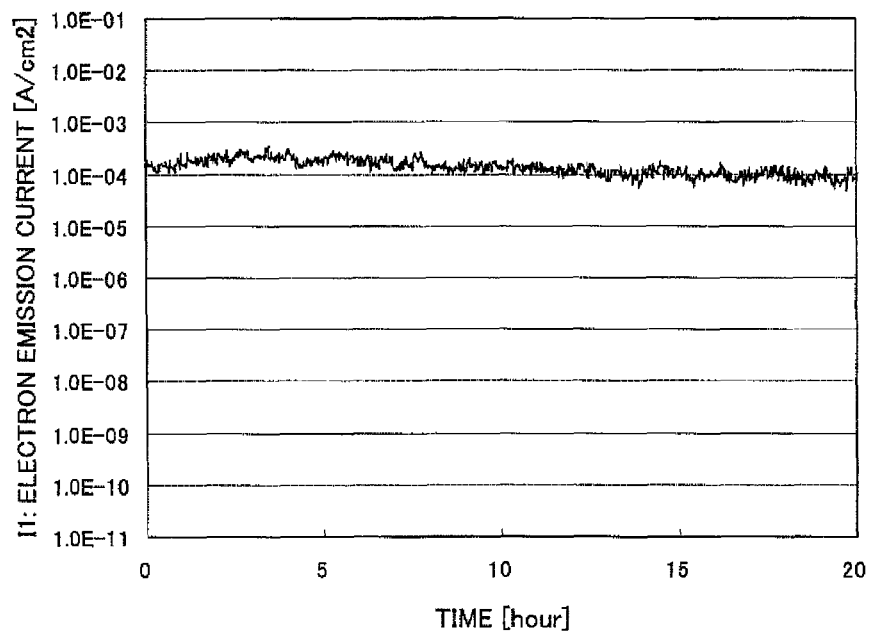
FIG. 10 is a drawing showing change of the electron emission current with time when the electron emitting element of Example 1 operated in vacuum.

FIG. 10 shows change of the electron emission current I2 with time when the electron emitting element 1 shown in FIG. 9 operated in vacuum. The parameters of the measurement system of FIG. 4 used for the electron emission experiment were as follows. The diameter of the insulating spacer 13 was 1 mm, the voltage V1 for driving the electron emitting element 1 was 14.5 V, and the voltage V2 of the counter electrode 12 was 150 V.

FIG. 10 indicates that stable electron emission characteristics in vacuum were obtained.

Figure 11:
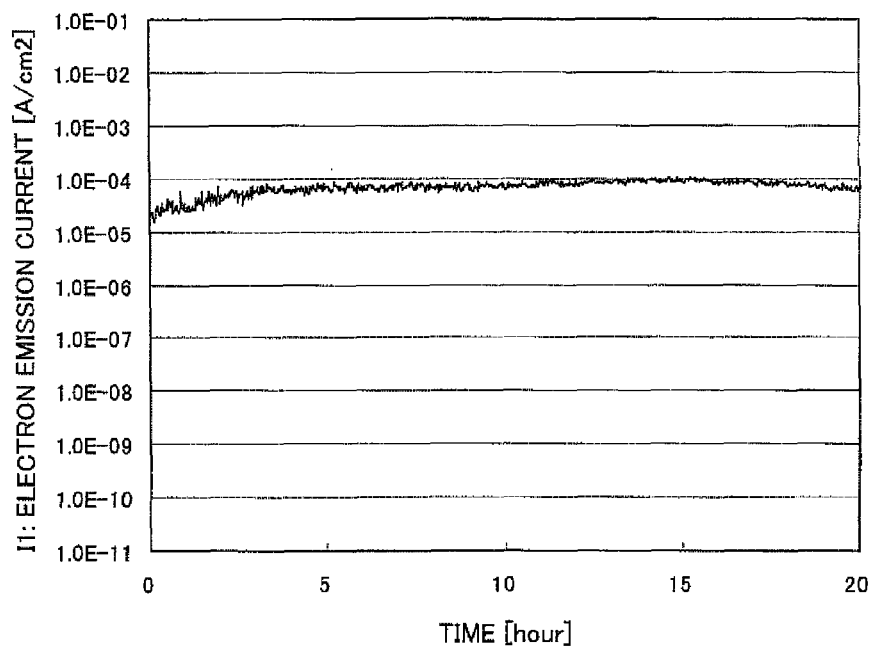
FIG. 11 is a drawing showing change of the electron emission current with time when the electron emitting element of Example 1 operated in the atmosphere (humidity: 1% RH or lower)

FIG. 11 shows change of the electron emission current I2 with time when the electron emitting element 1 shown in FIG. 9 operated under an atmospheric pressure (room atmosphere in which the humidity was controlled to 1% RH or less was used). The parameters of the measurement system of FIG. 4 used for the electron emission experiment were as follows. The diameter of the insulating spacer 13 was 130 μm, the voltage V1 for driving the electron emitting element 1 was 17.0 V, and the voltage V2 of the counter electrode 12 was 600 V.

FIG. 11 indicates that stable electron emission characteristics were obtained even in the room atmosphere under an atmospheric pressure.

Modification of Insulating Layer

Figure 12:
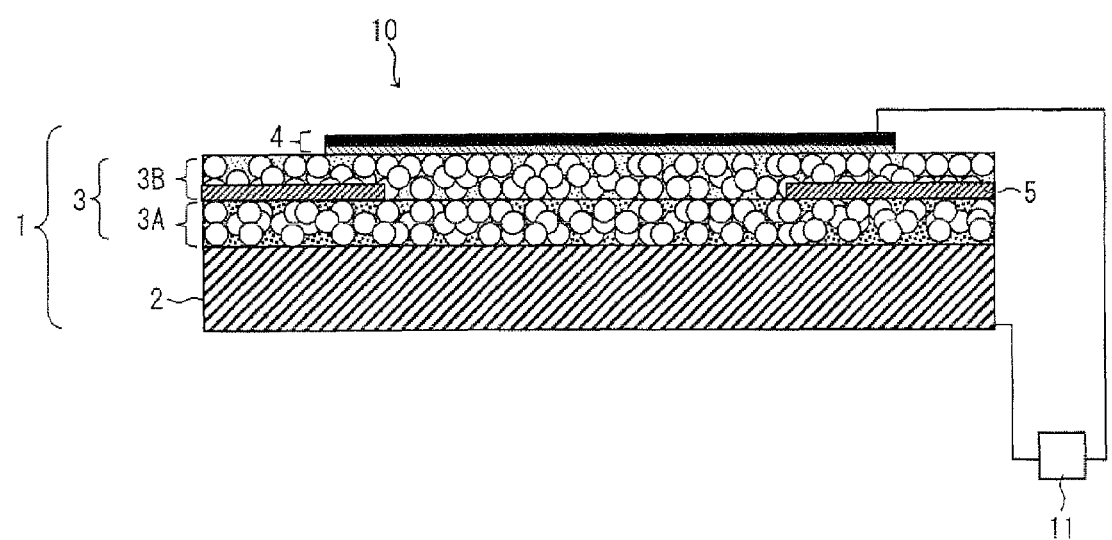
FIG. 12 is a schematic view illustrating a configuration of a modification of the insulating layer according to Embodiment 1 of the present invention.
Figure 1:
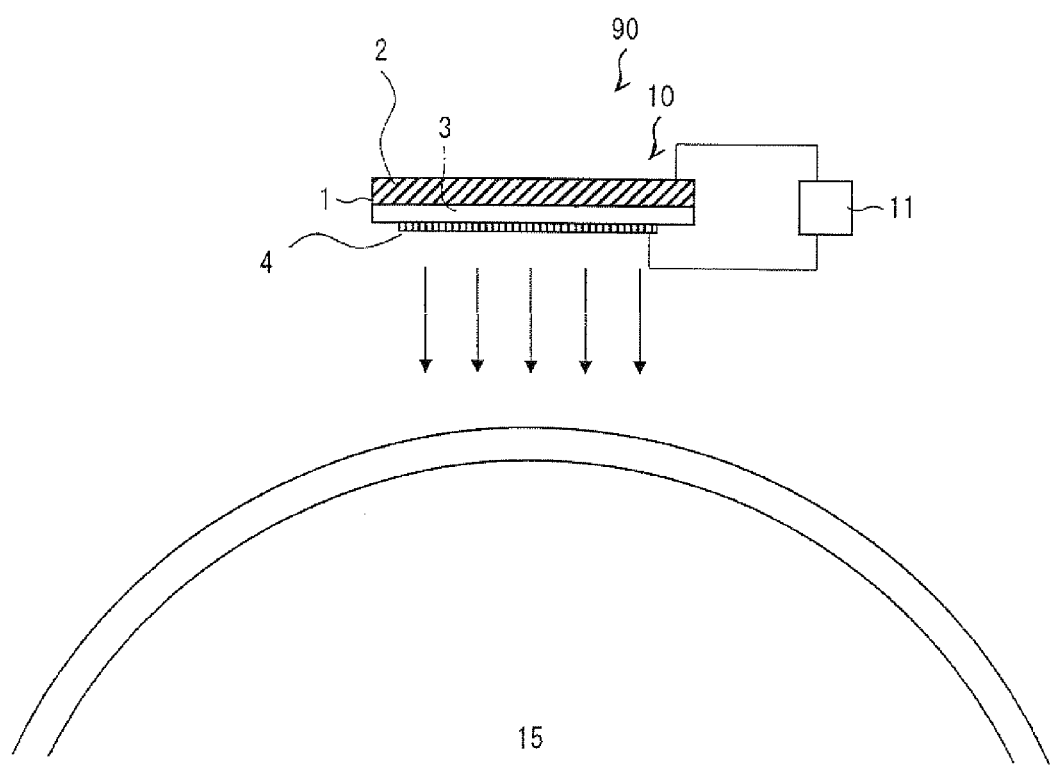

FIG. 12 is a schematic view illustrating a configuration of a modification of the insulator thin film (insulating layer) according to Embodiment 1 of the present invention.

As illustrated in FIG. 12, the insulator thin film 5 may be formed between the first fine particle layer 3A and the second fine particle layer 3B, and disposed so as to face the electrode substrate 2 and the thin-film electrode 4. In this case, the insulator thin film 5 is formed on the first fine particle layer 3A, the second fine particle layer 3B is formed on the insulator thin film 5, and the second fine particle layer 3B is also disposed in the opening of the insulator thin film 5. The insulator thin film 5 is configured to be in the same shape and planar arrangement as in Embodiment 1.

Such a configuration will also allow the insulator thin film 5 to lessen influence of concentration of an electric field occurring at the edges of the thin-film electrode 4 on the fine particle layer 3 to inhibit abnormal current constriction.

Embodiment 2

FIG. 13 illustrates an example of a charging device 90 and an image forming apparatus according to an embodiment of the present invention.

The charging device 90 includes the electron emitting element 1 of Embodiment 1 and the power supply 11 for applying a voltage to the electron emitting element, and is used as a device for charging a surface of a photoreceptor drum 15 (the configuration is the same as that of the above-described electron emitting device 10).

The image forming apparatus includes the charging device 90, and the electron emitting element 1 in the charging device 90 is disposed so as to face the photoreceptor drum 15 to be charged. Application of a voltage to the electron emitting element 1 causes electron emission so that the surface of the photoreceptor drum 15 is electrically charged.

In the image forming apparatus of the present invention, other than the charging device 90, conventionally known members can be used. The electron emitting element 1 serving as the charging device 90 is preferably disposed so as to be, for example, 3 mm to 5 mm apart from the surface of the photoreceptor drum 15.

Since the electron emitting device 10 serving as the charging device 90 can operate continuously over a long period of time, the charging device 90 can be steadily used for a long period of time. The image forming apparatus including such a charging device 90 can be also steadily used for a long period of time.

Further, the electron emitting device 10 serving as the charging device 90 is configured as a planar electron source. Therefore, the electron emitting device 10 is capable of charging the photoreceptor drum 15 on an area that has a width in a rotation direction. This provides many chances for charging a section of the photoreceptor drum 15. Therefore, the charging device 90 can perform more uniform electric charging as compared to a wire charging device, which performs electric charging line by line. Further, the charging device 90 has an advantage such that the voltage being applied is approximately 10V, which is far lower than that of a corona discharge device, which requires a voltage of several kV be applied.

Embodiment 3

Figure 14:
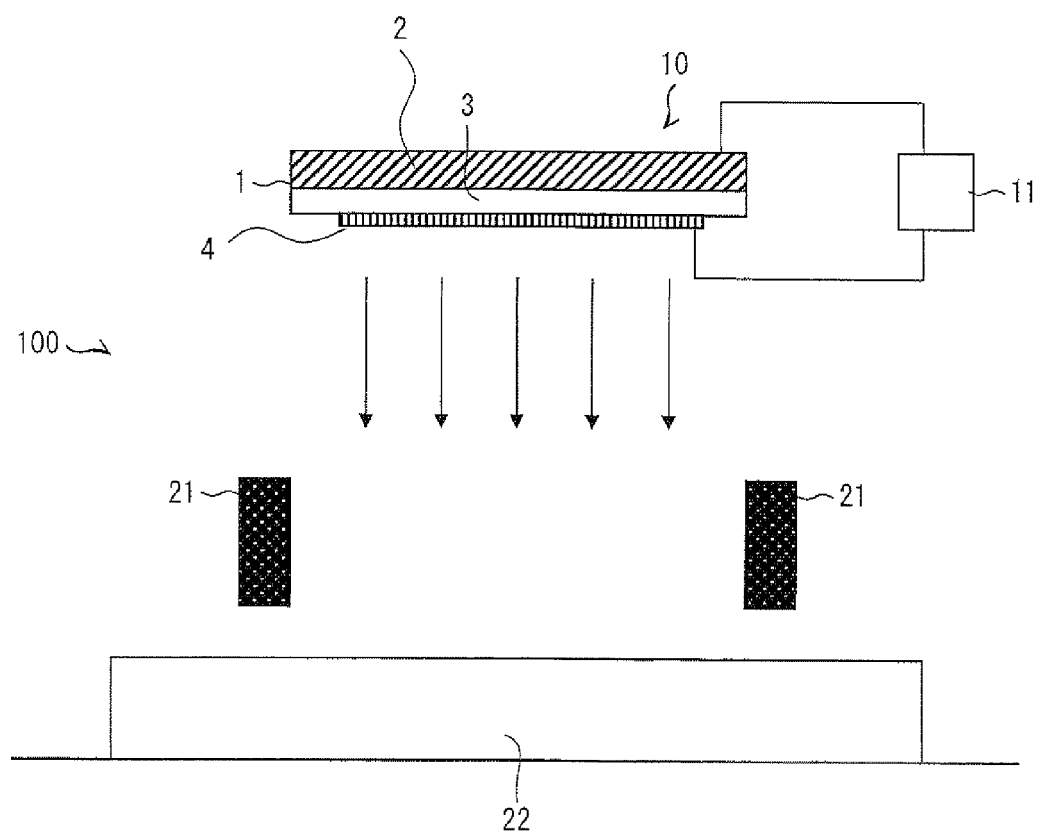
FIG. 14 is a drawing illustrating an example of an electron-beam curing device including an electron emitting element of the present invention.

FIG. 14 illustrates an example of an electron-beam curing device 100 according to an embodiment of the present invention. The electron-beam curing device 100 comprises the electron emitting device 10 having the electron emitting element 1 of Embodiment 1 and the power supply 11 for applying a voltage to the electron emitting element, and an accelerating electrode 21 for accelerating electrons. In the electron-beam curing device 100, the electron emitting element 1 serving as an electron source emits electrons, and the electrons emitted are accelerated by the accelerating electrode 21 so that the electrons collide with a resist 22. Energy necessary for curing the general resist 22 is not more than 10 eV. In terms of energy, therefore, the accelerating electrode is not necessary. However, in order to entirely cure the resist 22 having a thickness of 1 µm, for example, an accelerating voltage of approximately 5 kV is required, because a penetration depth of an electron beam is determined by a function of energy of electrons.

In a conventional general electron-beam curing device, an electron source is sealed in vacuum and caused to emit electrons by application of a higher voltage (50 kV to 100 kV). The electrons are taken out through an electron window and used for irradiation. According to this electron emission method, loss of a large amount of energy occurs in the electrons when the electrons pass through the electron window. Further, the electrons that have reached the resist also pass through the resist in the thickness direction, because the electrons have high energy. This leads to decrease in energy utilization efficiency. In addition, since an area on which electrons are thrown at a time is small and irradiation is performed in a manner drawing with dots, throughput is low.

On the other hand, the electron-beam curing device of the present invention including the electron emitting device 10 can work in the atmosphere, so that the electron-beam curing device does not need to be sealed in vacuum. Since the electron emitting device 10 can continuously operate in the atmosphere over a long period of time, the electron-beam curing device can be also steadily used for a long period of time. In addition, since the electron emitting element 1 is improved in the electron emission efficiency, the electron-beam curing device can perform the irradiation with electron beams efficiently. Further, the electron-beam curing device is free from energy loss, because the electrons do not pass through the electron window. This allows reduction of the voltage being applied. Moreover, since the electron-beam curing device has a planar electron source, the throughput increases significantly. When electrons are emitted in accordance with a pattern, maskless exposure will be possible.

Embodiment 4

FIGS. 15 to 18 illustrate examples of a light emitting device according to an embodiment of the present invention, respectively.

Figure 15:
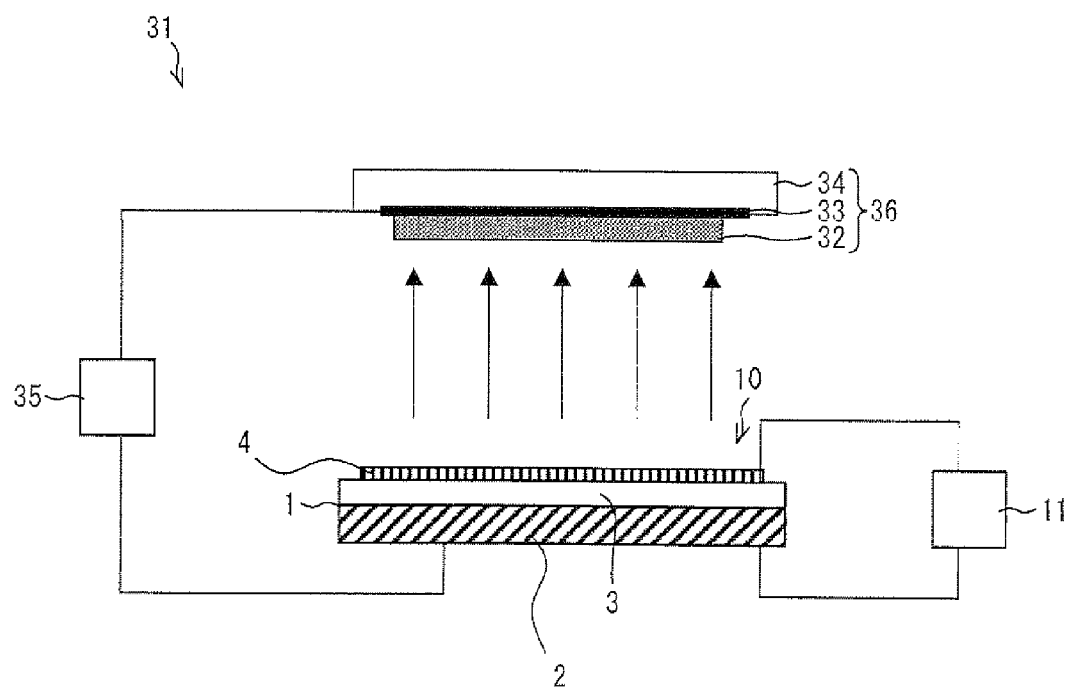
FIG. 15 is a drawing illustrating an example of a light emitting device including an electron emitting element of the present invention.

A light emitting device 31 illustrated in FIG. 15 comprises an electron emitting device having the electron emitting element 1 of Embodiment 1 and the power supply 11 for applying a voltage to the electron emitting element; and a light-emitting section 36 disposed in a position that is apart from the electron emitting element 1 and that faces the electron emitting element 1. The light-emitting section 36 has a laminated structure including a glass substrate 34 serving as a base material, an ITO film 33 and a luminous body 32.

Suitable materials of the luminous body 32 are materials that are excited by electrons and that correspond to red light emission, green light emission and blue light emission, respectively. Examples usable as such materials corresponding to red include $Y_2O_3$:Eu and (Y, Gd) $BO_3$:Eu; examples usable as such materials corresponding to green include $Zn_2SiO_4$: Mn and $BaAl_{12}O_{19}$: Mn; and examples usable as such materials corresponding to blue include $BaMgAl_{10}O_{17}$:$Eu^{2+}$. A film of the luminous body 32 is formed on the ITO film 33 formed on a surface of the glass substrate 34. The luminous body 32 preferably has a thickness of approximately 1 µm. Further, the ITO film 33 may have any thickness as long as the ITO film 33 can ensure electric conductivity. In the present embodiment, the ITO film 33 has a thickness of 150 nm.

For forming the film of the luminous body 32, a mixture of an epoxy resin serving as a binder and fluorescent fine particles is prepared, and a film of the mixture may be formed by a known method such as a bar coater method and a dropping method.

In this embodiment, in order to increase a brightness of light emitted from the luminous body 32, it is necessary to accelerate, toward the luminous body, electrons which are emitted from the electron emitting element 1. Accordingly, between the electrode substrate 2 of the electron emitting element 1 and the ITO film 33 of the light-emitting section 36, a power supply 35 is preferably provided for applying a voltage to form an electric field for accelerating the electrons. In this case, it is preferable that: a distance between the luminous body 32 and the electron emitting element 1 is 0.3 mm to 1 mm; a voltage applied by the power supply 11 is 18V; and a voltage applied by the power supply 35 is 500 V to 2000 V.

Figure 16:
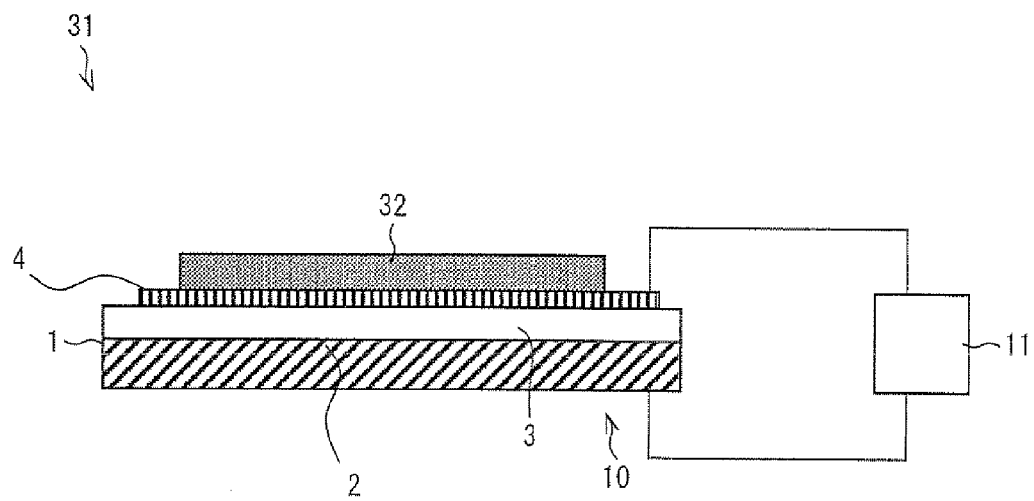
FIG. 16 is a drawing illustrating another example of the light emitting device including an electron emitting element of the present invention.

A light emitting device 31' illustrated in FIG. 16 includes the electron emitting element 1 of Embodiment 1, the power supply 11 for applying a voltage to the electron emitting element and the luminous body 32. In the light emitting device 31', the luminous body 32 is a planar luminous body which is provided on a surface of the electron emitting element 1. In the present embodiment, a layer of the luminous body 32 is formed on the surface of the electron emitting element 1, in such a manner that a mixture of an epoxy resin serving as a binder and luminous-body fine particles is prepared as described above and a film of the mixture is formed on the surface of the electron emitting element 1. Note that, because the electron emitting element 1 itself has a structure which is vulnerable to external force, the element may be damaged as a result of use of the bar coater method. It is therefore preferable to use the dropping method or the spin coating method.

Figure 17:
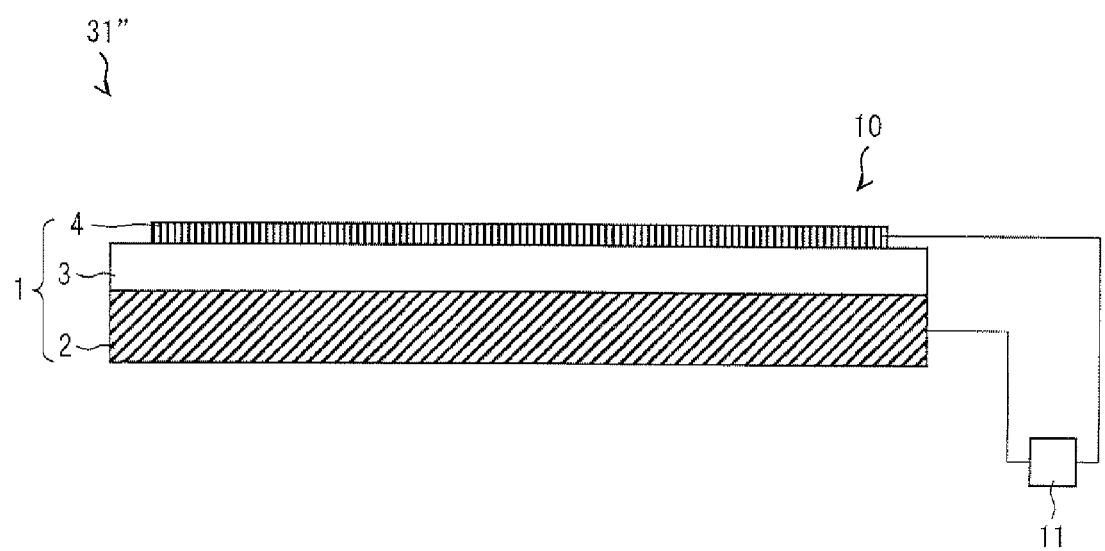
FIG. 17 is a drawing illustrating still another example of the light emitting device including an electron emitting element of the present invention.

A light emitting device 31" illustrated in FIG. 17 comprises the electron emitting device 10 having the electron emitting element 1 of Embodiment 1 and the power supply 11 for applying a voltage to the electron emitting element. Further, in the electron acceleration layer 3 of the electron emitting element 1, fluorescent fine particles as a luminous body 32' are mixed. In this case, the fine particles of the luminous body 32' may serve also as the insulating fine particles 6A. Generally, however, the fluorescent fine particles have a low electric resistance, which is obviously lower than the electric resistance of the insulating fine particles 6A. Therefore, when the fluorescent fine particles are mixed instead of the insulating fine particles 6A, the amount of the fluorescent fine particles being mixed should be kept to small. For example, when spherical silica particles (average diameter: 110 nm) are used as the insulating fine particles 6A and ZnS:Mg (average diameter: 500 nm) is used as the fluorescent fine particles, an appropriate mixture ratio by weight of the insulating fine particles 6A and the fluorescent fine particles is approximately 3:1.

In the light emitting devices 31, 31', 31", electrons emitted from the electron emitting element 1 are caused to collide with the corresponding fluorescent body 32 or 32' so that light is emitted. Since the electron emitting element 1 can operate continuously over a long period of time, the light emitting devices 31, 31', 31' can also operate steadily for a long period of time. Since the electron emitting device 10 can emit electrons in the atmosphere, the light emitting devices 31, 31', 31" can work in the atmosphere. However, sealed in vacuum, the light emitting devices 31, 31', 31" can emit light more efficiently because the electron emission current increases.

Figure 18:
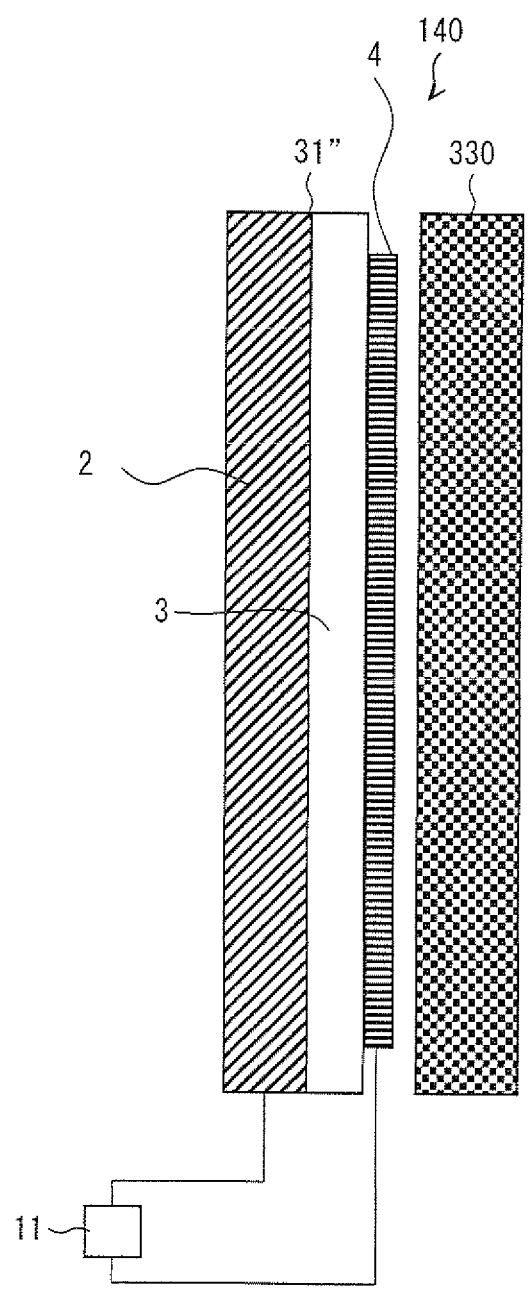
FIG. 18 is a drawing illustrating an example of an image display device equipped with a light emitting device including an electron emitting element of the present invention.

Further, FIG. 18 illustrates an example of an image display device according to an embodiment of the present embodiment. An image display device 140 illustrated in FIG. 18 includes the light emitting device 31" illustrated in FIG. 17 and a liquid crystal panel 330. In the image display device 140, the light emitting device 31" is disposed behind the liquid crystal panel 330 and used as a backlight. When the light emitting device 31" is used in the image display device 140, it is preferable that a voltage of 20 V to 35 V is applied to the light emitting device 31" The light emitting device 31" should be configured to emit, for example, 10 $\mu A/cm^2$ of electrons per unit time at the voltage of 20 V to 35 V. Further, it is preferable that the distance between the light emitting device 31" and the liquid crystal panel 330 is approximately 0.1 mm.

When the light emitting device 31 illustrated in FIG. 15 is used for the image display device according to the embodiment of the present invention, a plurality of the light emitting devices 31 may be arranged in a matrix so as to form a shape that allows the light emitting devices 31 themselves serving as an FED to form and display an image. In this case, it is preferable that a voltage of 20 V to 35 V is applied to the light emitting devices 31. The light emitting devices 31 should be configured to emit, for example, 10 $\mu A/cm^2$ of electrons per unit time at the voltage of 20 V to 35 V.

Embodiment 5

Figure 20:
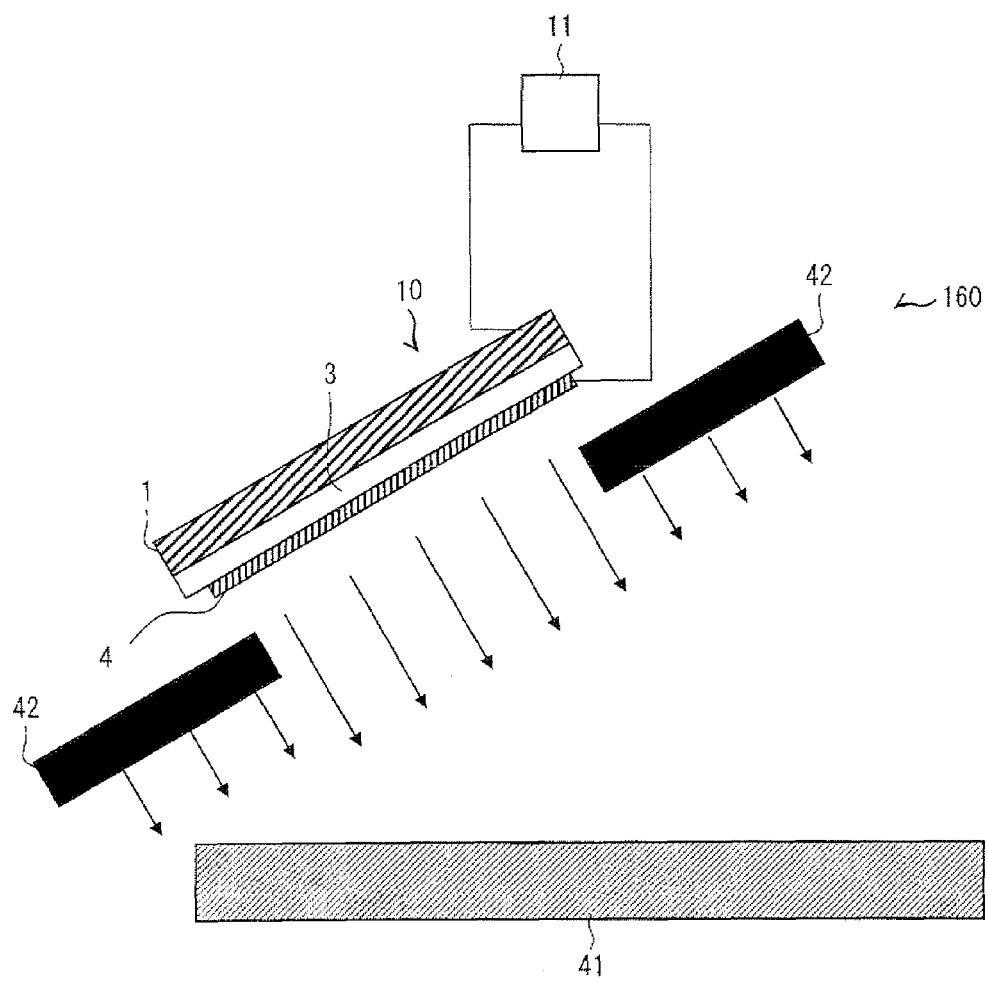
FIG. 20 is a drawing illustrating an example of an air blowing device (cooling device) including an electron emitting element of the present invention.

FIG. 19 and FIG. 20 illustrate examples of an air blowing device according to an embodiment of the present invention, respectively. The following description deals with a case where the air blowing device of the present embodiment is used as a cooling device. However, application of the air blowing device is not limited to a cooling device.

An air blowing device 150 illustrated in FIG. 19 comprises the electron emitting device 10 having the electron emitting element 1 and the power supply 11 for applying a voltage to the electron emitting element. In the air blowing device 150, the electron emitting element 1 emits electrons toward an object 41 to be cooled so that ion wind is generated and the object 41 electrically grounded is cooled. In the cooling, it is preferable that a voltage of approximately 18 V is applied to the electron emitting element 1 and the electron emitting element 1 emits, for example, 1 $\mu A/cm^2$ of electrons per unit time in the atmosphere at the voltage.

In addition to the configuration of the air blowing device 150 illustrated in FIG. 19, an air blowing device 160 illustrated in FIG. 20 includes a blowing fan 42. In the air blowing device 160 illustrated in FIG. 20, the electron emitting element 1 emits electrons toward the object 41 to be cooled, and the blowing fan 42 blows air toward the object 41 to send the electrons emitted from the electron emitting element toward the object 41 and generate ion wind so that the object 41 electrically grounded is cooled. In this case, it is preferable that an air volume generated by the blowing fan 42 is 0.9 L to 2 L per minute per square centimeter.

When the object 41 is cooled only by air blown by a fan or the like as in the case of a conventional air blowing device or a conventional cooling device, the flow rate on a surface of the object 41 will be 0 and the air in a section from which heat is dissipated most desirably is not replaced, leading to low cooling efficiency. However, when electrically charged particles such as electrons or ions are included in the air blown, the air blown is attracted to the surface of the object 41 by electric force when in the vicinity of the object 41 to allow the air in the vicinity of the surface of the object 41 to be replaced. Here, since the air blowing devices 150, 160 of the present invention blow air including electrically charged particles such as electrons or ions, the cooling efficiency is significantly improved. Furthermore, since the electron emitting element 1 is improved in the electron emission efficiency, the air blowing devices 150, 160 can perform the cooling more efficiently. The air blowing devices 150, 160 can operate also in the atmosphere.

The present invention is not limited to the embodiments and the examples described above, and various other changes may be made within the scope of the invention as defined by the appended claims. That is, other embodiments obtained by combining technical means appropriately changed within the scope of the present invention as defined by the appended claims are also included in the technical scope of the present invention. For example, the first fine particle layer and the second fine particle layer may be interchanged to be applied to the electron emitting element of Embodiment 1.

INDUSTRIAL APPLICABILITY

The electron emitting element according to the present invention can operate continuously over a long period of time. Accordingly, the electron emitting element of the present invention can be suitably applied to, for example, a charging device of an image forming apparatus such as an electrophotographic copying machine, a printer and a facsimile; an electron-beam curing device; an image display device when in combination with a luminous body; and a cooling device when utilizing ion wind generated by electrons emitted therefrom.

What is claimed is:

1. An electron emitting element, comprising:
a first electrode;
an insulating layer formed on the first electrode and having an opening of through hole;
a second electrode formed on the insulating layer, the second electrode being disposed so as to cover at least the opening and face the first electrode via the opening; and
a fine particle layer disposed between the first electrode and the second electrode, the fine particle layer being composed of insulating fine particles and conductive fine particles,
wherein the insulating layer is disposed between the first electrode and the fine particle layer, or between the second electrode and the fine particle layer, when a voltage is applied between the first electrode and the second electrode, electrons are emitted from the first electrode and accelerated in the fine particle layer to pass through the second electrode, the fine particle layer is disposed on the opening, and
the second electrode is disposed on the insulating layer so that edges thereof do not coincide with edges of the opening and overlap the insulating layer.

2. The electron emitting element according to claim 1, wherein the insulating layer is formed to be in contact with the first electrode, and the fine particle layer is disposed between the second electrode and the insulating layer.

3. The electron emitting element according to claim 1, wherein the insulating layer is formed from a silicone resin.

4. The electron emitting element according to claim 1, wherein the second electrode have recesses in its surface.

5. The electron emitting element according to claim 1, wherein the second electrode includes a first electrode layer formed on a side of the fine particle layer and a second electrode layer formed on the first electrode layer and having a resistance higher than the first electrode layer, and the recesses are formed in a surface of the first electrode layer.

6. The electron emitting element according to claim 5, wherein the recesses penetrate the first electrode layer so that the second electrode layer is electrically connected with the fine particle layer.

7. The electron emitting element according to claim 5, wherein the first electrode layer may be an amorphous carbon layer.

8. The electron emitting element according to claim 5, wherein the second electrode layer may be a metal layer.

9. The electron emitting element according to claim 8, wherein, the second electrode layer may be formed of a material including at least one of gold, silver, tungsten, titanium, aluminum and palladium.

10. The electron emitting element according to claim 1, wherein the fine particle layer further comprises an insulating fine particle layer composed of insulating fine particles.

11. The electron emitting element according to claim 1, wherein the insulating fine particles and the conductive fine particles composing the fine particle layer are fixed together by a silicone resin.

12. The electron emitting element according to claim 1, wherein the conductive fine particles are composed of a material containing at least one of gold, silver, platinum, palladium and nickel, and have an average particle diameter of 3 nm to 10 nm.

13. The electron emitting element according to claim 1, wherein the insulating fine particles are composed of a material containing at least one of $SiO_2$, $Al_2O_3$ and $TiO_2$, and have an average particle diameter of 10 nm to 1000 nm.

14. The electron emitting element according to claim 1, wherein the electron emitting element is used together with a luminous body in a light emitting device to emit electrons to cause the luminous body to emit light.

15. The electron emitting element according to claim 14, wherein the electron emitting element is used as a light emitting device in an image display device.

16. The electron emitting element according to claim 1, wherein the electron emitting element is used together with a fan in a cooling device to generate ion wind to cool an object.

17. The electron emitting element according to claim wherein the electron emitting element is used together with a photoreceptor in a charging device to emit electrons to charge the photoreceptor.

18. The electron emitting element according to claim 17, wherein the electron emitting element is used as a charging device in an image forming apparatus.

19. The electron emitting element according to claim 1, wherein the electron emitting element is used as an electron source in an electron-beam curing device for curing a resist to cause electrons to collide with the resist so that the resist is cured.

20. The electron emitting element according to claim 1, which further comprises a power supply for applying a voltage between the first electrode and the second electrode.

21. The electron emitting element according to claim 10, wherein the insulating fine particle layer is disposed between the second electrode and the layer being composed of insulating fine particles and conductive fine particles.

* * * * *